United States Patent [19]
Sato

[11] Patent Number: 6,167,053
[45] Date of Patent: Dec. 26, 2000

[54] EXCHANGE SYSTEM

[75] Inventor: Shuichi Sato, Sagamihara, Japan

[73] Assignee: Kabushiki Kaisha Toshiba, Kawasaki, Japan

[21] Appl. No.: 09/014,597

[22] Filed: Jan. 28, 1998

[30] Foreign Application Priority Data

Jan. 31, 1997 [JP] Japan ................................. 9-019395
Feb. 20, 1997 [JP] Japan ................................. 9-035773

[51] Int. Cl.⁷ ................................................ H04L 12/28
[52] U.S. Cl. .......................... 370/410; 370/219; 379/269
[58] Field of Search ................................. 370/410, 409, 370/358, 397, 338, 219, 395, 445, 313; 714/797; 717/11; 709/212, 218; 455/518, 462

[56] References Cited

U.S. PATENT DOCUMENTS

| | | | |
|---|---|---|---|
| 3,654,603 | 4/1972 | Gunning et al. | 364/222.2 |
| 5,274,633 | 12/1993 | Kato et al. | 370/219 |
| 5,287,515 | 2/1994 | Murai | 364/228.1 |
| 5,408,527 | 4/1995 | Tsutsu . | |
| 5,559,861 | 9/1996 | Takehisa | 455/462 |
| 5,973,612 | 10/1999 | Deo et al. | 370/313 |

*Primary Examiner*—Wellington Chin
*Assistant Examiner*—Prenell Jones
*Attorney, Agent, or Firm*—Finnegan, Henderson, Farabow, Garrett & Dunner, L.L.P.

[57] ABSTRACT

An exchange system comprises a main device including a plurality of interface sections each containing one of an extension terminal, an office line, and a private line, and a plurality of exchange control systems. The exchange system also comprises a control data management device connected to the main device and including a data storage section for storing a number of control data items, wherein each of the plurality of exchange control systems includes an exchange section for arbitrarily exchanging connections of the interface sections, and a first request section for requesting a control data item necessary for an exchange service to be provided, from the control data management device. The control data management device includes a requested data output section for reading the control data item requested by the first request section and for outputting the control data item to the main device. Each of the plurality of exchange control systems includes an exchange control section for controlling each of the exchange section and the plurality of interface sections, based on the control data item outputted from the requested data output section, where any of the exchange control systems is defined as an active system.

27 Claims, 27 Drawing Sheets

| ID | SUB-ID | STATUS |
|---|---|---|
| A | — | ACQUIRED |
| B | — | NOT |
| C | — | ACQUIRED |
| D | — | ACQUIRED |
| E | E1 | NOT |
| E | E2 | ACQUIRED |
| E | E3 | ACQUIRED |
|  |  |  |
|  |  |  |

FIG. 6

| ID | SUB-ID |
|---|---|
| A | — |
| C | — |
| E | E2 |
| | |
FIG. 12
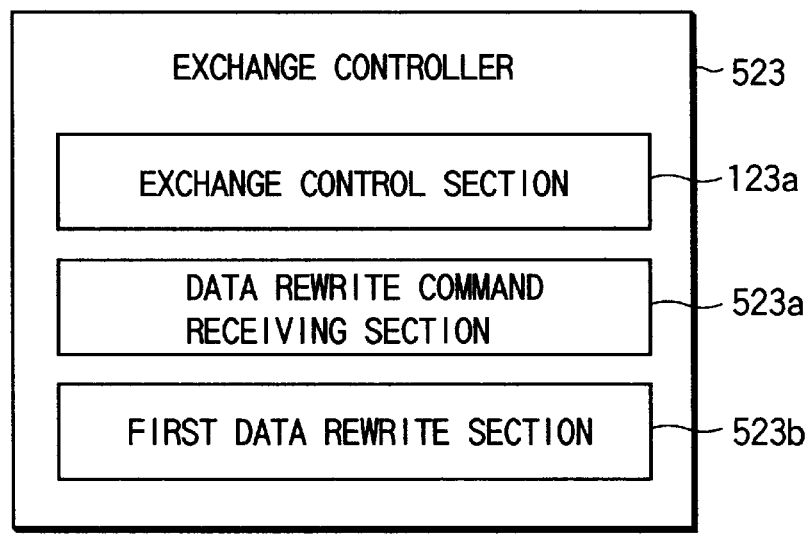
FIG. 13A
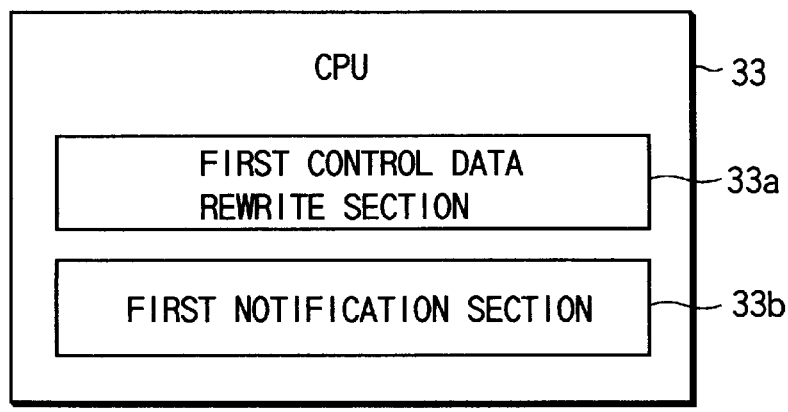
FIG. 13B

| ID | SUB-ID | ADDRESS | SIZE | TIME OF LAST REFERENCE |
|---|---|---|---|---|
| A | — | AA | AAA | 96/3/26 12:00:07.235 |
| B | — | — | — | — |
| C | — | CC | CCC | 96/3/26 12:00:07.578 |
| D | — | DD | DDD | 96/3/26 12:08:02.765 |
| E | E1 | — | — | — |
| E | E2 | EE2 | EEE2 | 96/3/26 12:00:07.823 |
| E | E3 | EE3 | EEE3 | 96/3/26 12:05:05.578 |
| --- | ---- | --- | --- | --- |

FIG. 25

| ID | SUB-ID | ADDRESS | SIZE |
|---|---|---|---|
| A | — | AA | AAA |
| B | — | — | — |
| C | — | CC | CCC |
| D | — | DD | DDD |
| E | E1 | — | — |
| E | E2 | EE2 | EEE2 |
| E | E3 | EE3 | EEE3 |
| --- | ---- | --- | --- |

FIG. 26

EXCHANGE SYSTEM

BACKGROUND OF THE INVENTION

The present invention relates to an exchange system realized, for example, as a private branch exchange system.

This application is based on Japanese Patent Application No. 9-19395, filed Jan. 31, 1997 and Japanese Patent Application No. 9-35773, filed Feb. 20, 1997, the contents of which are incorporated herein for reference.

As known, in a large scale communication network, the kinds of exchange services required for an exchange system have increased more and more widely. An example of those exchange services will be an abbreviation dial service. To achieve this service, phone numbers of persons to be called, corresponding to predetermined abbreviation numbers, are stored as administrate data in a memory of an exchange system.

In an exchange system, a plurality of control systems (or exchange devices) are multiplexed to improve the reliability, and each of the plurality of control systems must store control data such as administrate data, maintenance data, and the like. Consequently, the entire exchange system must have a large memory capacity. Further, if the control systems are multiplexed, data transfer from an act system to a stand-by system is carried out in order that control data must correspond to each of the multiplexed control systems. However, in accordance with an increase of control data as described above, the time period required for the data transfer increases. If an obstacle appears in a system during the time period, normal exchange services cannot be provided securely and the reliability of the system is deteriorated.

In a conventional exchange system as described above, a plurality of control systems multiplexed to construct an exchange system, in order to improve the reliability, and same control data is stored in each of the plurality of multiplexes systems, so that the memory capacity of the exchange system is pressed heavily. In addition, a long processing time is required for performing data transfer and conversion processing to unify the control data to be stored in each of the multiplexed control systems, so that provision of normal exchange services cannot be secured, resulting in a drawback that the reliability of the system is deteriorated.

Control data set on a memory in an exchange system is backed up into an external storage device such as a hard disc or the like. In a method of back-up, control data on a memory is transferred to an external storage device at a predetermined time point or at a time point when a system manager issues a request. However, in this method, if another setting processing is carried out while control data is transferred to an external device such as a hard disc or the like, a problem occurs in that control data set by the other setting processing is not stored in the external storage device before a next timing.

In another method of back-up, a command for setting, updating, or changing the control data on the memory is stored in an external storage device every time when a maintenance man or a system manager inputs the command. In this method, however, there are drawbacks that control data changed by a telephone terminal cannot be reflected on an exchange system since the command is not input to the exchange system, and that the area on an external storage device for storing the history of inputted commands is limited so that the history of all commands cannot be stored.

Further, both of the methods described above result in a problem that data common to all the multiplexed control systems or to some of the control systems cannot be changed once by one single operation if an exchange system is constructed by a plurality of multiplexed control systems.

However, in registration of control data relating to extension numbers, types of telephone terminals, and the like, the scale of the exchange system is enlarged and the amount of control data to be set increases. For example, a large amount of control data must be registered, changed, or deleted, when operation of a new exchange system is started, when software of exchange service is updated, when control data is reconstructed due to a malfunction or the like, or when telephone terminals belonging to an exchange system are additionally provided, reduced, or moved. Therefore, an exchange system which is provided with a management device for managing operation such as retrieve operation, automatic generation of control data, or the like has been put to practical use, in order to avoid a situation as described above.

In this exchange system, however, a maintenance man or service manager must input commands for setting control data by a terminal for every item of a large amount of control data to be registered, changed, or deleted, so that much labor and time are required. A problem hence occurs in that the reliability of the exchange system is thus deteriorated.

BRIEF SUMMARY OF THE INVENTION

Accordingly, it is an object of the present invention to provide an exchange system in which the amount of control data to be stored is reduced so that the memory capacity can be reduced and the reliability of the system can be improved.

Another object of the present invention is to provide an exchange system capable of avoiding a situation that a control data item, which is registered, changed, or deleted until storing is completed after once having started storing a control data item in the memory, into the external storage device, at a predetermined time or a time requested by a maintenance man or a system manager, is not stored in the external storage device.

Further object of the present invention is to provide an exchange system capable of storing a change history of a control data item, set by a telephone terminal or the like, and capable of storing a new command even when an area for storing commands for changing a control data item is limited.

Still another object of the present invention is to provide an exchange system capable of registering, changing, or deleting data common to all or part of exchange systems, if the system comprises a plurality of exchange systems.

Still further object of the present invention is to provide an exchange system capable of shortening the processing time required for making a setting operation for every control data item of a large amount of control data to be registered, changed, or deleted, and capable of shortening the time period for which an exchange service is stopped, so that deterioration of the reliability of the system during changing control data can be prevented.

According to the present invention, there is provided an exchange system comprising a main device including a plurality of interface sections each containing one of an extension terminal, an office line, and a private line, and a plurality of exchange control systems; and a control data management device connected to the main device and including a data storage section for storing control data items, wherein each of the plurality of exchange control systems includes an exchange section for exchanging connections of the interface sections, and a first request section for requesting a control data item necessary for an exchange service to be provided, from the control data management device, the control data management device includes a requested data output section for reading the control data item requested by the first request section from the data storage section and for outputting the control data item to the main device, and each of the plurality of exchange control systems includes an exchange control section for controlling the exchange section and the plurality of interface sections, based on the control data item outputted from the requested data output section, where any of the exchange control systems is defined as an active system.

An exchange system according to the present invention, wherein each of the plurality of exchange control systems includes a control data storage section for storing the control data item outputted by the requested data output section, each of the first request sections requests, to the control data management device, a control data item which is not stored in the control data storage section among control data items necessary for an exchange service to be performed by a control system whose first request section is requesting, and each of the exchange control sections controls the exchange section and the plurality of interface sections, based on the control data item outputted from the requested data output section and the control data items stored in the control data storage section, where any of the exchange control systems is defined as an active system.

An exchange system according to the present invention, wherein each of the first request sections requests, to the control data management device, a predetermined control data item among the number of control data items, when any of the control system is started where the control system started is defined as an active system.

An exchange system according to the present invention, wherein each of the first request sections requests, to the control data management device, a predetermined control data item among the number of control data items, when any of the exchange control systems is started where the control system started is defined as a stand-by system.

An exchange system according to the present invention, wherein each of the plurality of exchange control systems includes a data rewrite command receiving section for receiving a control data change request supplied though the plurality of interface sections, and for instructing the control data management device of a control data item to be changed and a content of a change, in accordance with the change request, and the control data management device includes a first control data changing section for changing a control data item stored in the control data storage section, in accordance with an instruction by the data change command receiving section.

An exchange system according to the present invention, wherein each of the plurality of exchange control systems includes a data rewrite command receiving section for receiving a control data change request supplied though the plurality of interface sections, and for instructing the control data management device of a control data item to be changed and a content of a change, in accordance with the change request, the control data management device includes a first control data rewrite section for changing a control data item stored in the control data storage section, in accordance with an instruction by the data rewrite command receiving section, and a first notification section for notifying the main device of a correct completion of the change of the control data item, and each of the plurality of exchange control systems includes a first control data rewrite section for rewriting a corresponding control data item in the control data storage section in accordance with a notification from the first notification section.

An exchange system according to the present invention, wherein the control data management device includes a second control data change section for receiving a predetermined control data change request and for changing a control data item stored in the control data storage section, in accordance with the control data change request.

An exchange system according to the present invention, wherein the control data management device includes a second control data change section for receiving a predetermined control data change request and for changing a control data item stored in the control data storage section, in accordance with the control data change request, and a second notification section for notifying the main device of a correct completion of the change of the control data item by the second control data change section, and each of the plurality of exchange control systems includes a second control data change section for changing a corresponding control data item in the control data storage section in accordance with a notification from the second notification section.

An exchange system according to the present invention, wherein each of the plurality of exchange control systems includes an acquirement status determining section for determining whether or not a control data requested by the first request section is acquired correctly, where any of the exchange control systems is defined as an active system; a second request section for requesting a control system defined as a stand-by system to send a corresponding control data item if the acquirement status determining section determines that a control data item has not been correctly outputted to the main device, where a control system is defined as an active system; and a requested data transfer section for transferring a corresponding control data item to a control system requesting, if a control data item corresponding to a request from the second request section is stored in the control data storage section, and if a control data item is transferred by the requested data transfer section, the exchange control section continues to control the exchange section and the plurality of interface sections in accordance with the control data item, and if no control data item is transferred by the requested data transfer section, the exchange control section stops controlling the exchange section and the plurality of interface sections.

An exchange system according to the present invention, wherein each of the plurality of exchange control systems includes an external storage section for storing a control data item outputted from the requested data output section, at a predetermined timing; an acquirement status determining section for determining whether or not a control data requested by the first request section has been acquired correctly, where any of the exchange control systems is defined as an active system; and a control data retrieve section for retrieving a corresponding control data item from control data items stored in the external storage device and for reading the corresponding control data item, if the acquirement status determining section determines that a control data item has not been correctly outputted to the main device, and if the corresponding control data item is read by the control data retrieve section, the exchange control section continues to control the exchange section and the plurality of interface sections in accordance with the control data item, and if no control data item is read by the control data retrieve section, the exchange control section stops controlling the exchange section and the plurality of interface sections.

An exchange system according to the present invention, wherein the exchange control section of each of the plurality of exchange control systems includes an exchange program for controlling the exchange section and the plurality of interface sections, such that the exchange program can be updated, each of the plurality of exchange control systems includes a program version notification section for notifying the control data management section, of the type of the exchange program of the control system, and the control data management device includes a control data conversion section for converting a control data item requested by the first request section, into a format corresponding to the type notified by the program version notification section provided in the control system requesting, and for thereafter making the requested data output section output the control data item to the main device.

An exchange system according to the present invention, wherein each of the exchange control systems includes a storage area monitor section for determining whether or not an empty area exists for storing a new control data item; and a control data erase section for obtaining an empty area by erasing a predetermined control data item among control data items stored in the control data storage section at a time point at which a determination is made by the storage area monitor section, if the storage area monitor section determines that no empty area for storing a new control data item exists in the control data storage section, when acquiring a new control data item, and a control data item newly acquired is stored into the empty area obtained by the control data erase section.

An exchange system according to the present invention, wherein the control data erase section erases one of a control data item acquired last, a control data item to which the exchange control section referred earliest, and a control data item to which the exchange control section referred at a lowermost frequency.

An exchange system according to the present invention, wherein the control data erase section erases one of a control data item acquired last, a control data item to which the exchange control section referred earliest, or a control data item to which the exchange control section referred at a lowermost frequency, among control data items other than the predetermined control data item.

An exchanger comprising a plurality of interface sections each containing one of an extension terminal, an office line, and a private line, and a plurality of exchange control systems, the exchanger used with a predetermined control data management device connected thereto, wherein each of the plurality of exchange control systems includes an exchange section for exchanging connections of the interface sections; a request section for requesting a control data item necessary for an exchange service to be provided, to the control data management device; and an exchange control section for controlling the exchange section and the plurality of interface sections, based on the control data item outputted from the control data management device, in accordance with a request by the request section, where any of the exchange control systems is defined as an active system.

A control data management device connected to an exchanger, the device comprising a control data storage section for storing a number of control data items; and a requested data output section for reading a control data item requested by the exchanger and for outputting the control data item to the exchanger.

An exchange system containing at least one control system and managed with use of a memory and/or an external storage device, by associating a control data item necessary for the control system to provide an exchange service, with an ID of the control data item, the system comprising an analysis section for analyzing a control data change request relating to registration, change, and deletion of the control data item, from an external input device or a telephone terminal; a change processing section for performing change processing corresponding to the control data change request, based on an analysis result of the analysis section; and a control data change history control section for generating a control data change history information item, by associating a context of a control data item as a target to be processed, after a change, with an ID of the control data item, when the change processing is performed, and for storing the control data item into the memory and/or the external storage device, wherein when the system starts or the control data change request is issued, the control data change history information item stored in the memory and/or the external storage device is analyzed, and change processing of the control data change history information item in the memory is performed again in accordance with the control data change history information item.

An exchange system according to the present invention, further comprising a change processing start control section for performing change processing on a control data item stored in the storage section, based on the control data change history item, when a control data change history information storage area exceeds a preset storage capacity in the memory and/or the external storage device, or for every control data change request from the external input device and the telephone terminal.

An exchange system according to the present invention, further comprising an erase section for erasing the control data change history information item in the memory and/or the external storage device, when data in the memory is stored into the external storage device, or when change processing is performed on a control data item stored in the external storage device, based on the control data change history information item.

An exchange system according to the present invention, further comprising a comparison section for comparing a context of a control data item in the memory with a context of a control data item in the external storage device; and means for changing the control data item in the memory by referring to a control data change history stored in the operating memory and the external storage device if both of the contexts are not equal to each other, and by referring to the control data item in the external storage device if a corresponding control data change history information item is not stored in the control data change history.

An exchange system containing at least one control system and comprising a system main section having a memory for storing a control data item necessary for the control system to provide an exchange service, and a management device connected to the system main section through a communication path and having a function of registering, changing, and deleting the control data item, for performing operation management of the system main section, wherein the management device comprises a control data file generating section for generating a control data file including a control data ID for identifying a control data item, and a control data item corresponding to the control data ID, for every control data item inputted from an external input device; a storage section for storing the control data file; and a transfer control section for transferring the control data file stored in the storage section, to the system main section through the communication path; and the system main section comprises a reception control section for controlling reception of the control data file transferred from the management device; a temporary storage section for temporarily storing the control data file received by the reception control section; and a control data update processing section for storing the control data file stored in the temporary storage section, into the operating memory, thereby to update a corresponding control data item, when the system of itself starts operating.

An exchange system according to the present invention, wherein the control data file generating section includes a control data compatibility processing section for processing a control data item inputted, so as to be a control data file of a format which can be dealt with by the may system section.

An exchange system according to the present invention, wherein the control data compatibility processing section includes a first recording section for adding information concerning at least a type of data, a length of data, and an order of bytes forming data, to each of the control data ID in the control data file inputted and the control data context corresponding to the control data ID, and for recording the control data file into the storage section, in the order of bytes forming data, and the control data update processing section includes a first read section for reading the control data file stored in the temporary storage section, into the operating memory, in a manner in which the control data ID and the data context corresponding to the control data ID are read in accordance with the type of data, the length of data, and the order of bytes forming data, recorded in the control data file.

An exchange system according to the present invention, wherein the control data compatibility processing section is constituted by a second recording section for adding information concerning at least a type of data, a length of data, and an order of bytes forming data, to each of the control data ID in the control data file inputted and the control data context corresponding to the control data ID, and for recording the control data file into the storage section, in the order of bytes forming data, and the control data update processing section includes a second read section for reading the control data file stored in the temporary storage section, into the operating memory, in a manner in which the control data ID and the data context corresponding to the control data ID are read in accordance with the type of data, the length of data, and the order of bytes forming data, recorded in the control data file.

An exchange system according to the present invention, wherein the management device comprises a determining section for determining whether the control data file inputted is of a format which can be read by the system main section; and a conversion section for converting the control data file into a format which can be read by the system main section can read if the control data file is determined as not being of a format which can be read by the system main section.

An exchange system according to the present invention, wherein the management device includes a function property acquirement section for obtaining function property information representing a function of the main system body, and the determining section makes a determination, based on the function property information obtained from the system main section.

An exchange system according to the present invention, wherein the function property information contains at least a type of the system main section, a model thereof, a CPU type thereof, and a version of an exchange program thereof.

An exchange system according to the present invention, wherein the management device includes a function property setting section for setting the function property information inputted from the external input device, and the determining section makes a determination, based on the function property information obtained from the system main section.

An exchange system according to the present invention, wherein the function property information contains at least a type of the system main section, a model thereof, a CPU type thereof, and a version of an exchange program thereof.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 6 is a table showing an example of information for managing control data obtained from the control data management device according to the second embodiment;

FIG. 12 is a table showing a combination of control data to be obtained according to the fourth embodiment;

FIG. 13A is a view showing a structure of an exchange controller of an exchanger according to a fifth embodiment of the present invention;

FIG. 13B is a view showing a structure of a central processing unit of a control data management device according to the fifth embodiment of the present invention;

FIG. 25 is a table showing an example of management information concerning areas from which control data is obtained, according to the tenth embodiment;

FIG. 26 is a table showing another example of management information concerning areas from which control data is obtained;

DETAILED DESCRIPTION OF THE INVENTION

A preferred embodiment of an exchange system according to the present invention will now be described with reference to the accompanying drawings.

In the following, embodiments of exchange systems according to the present invention will be explained with reference to the drawings.

First Embodiment

Figure 1:
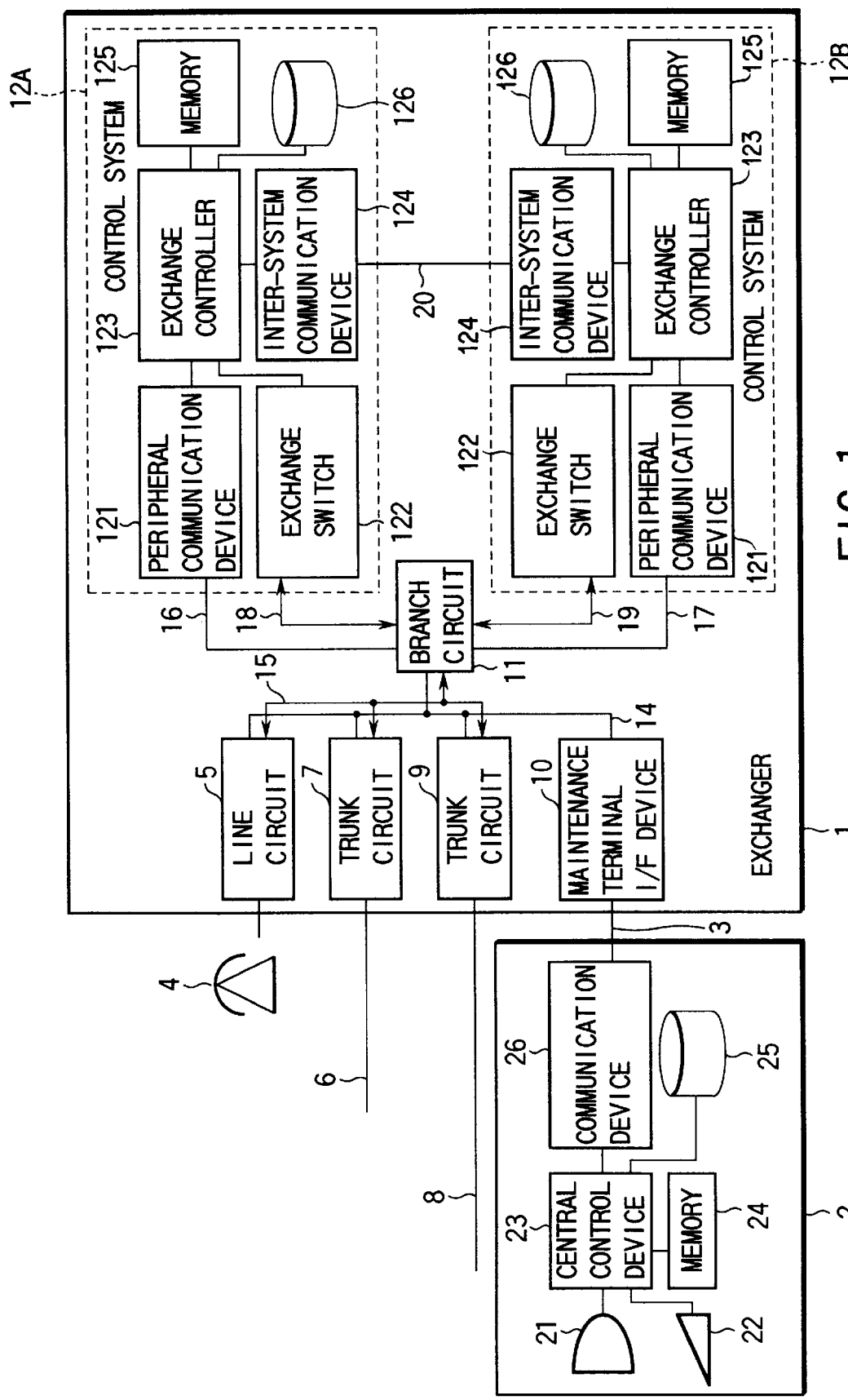
FIG. 1 is a circuit block diagram showing a structure of an exchange system according to a first embodiment of the present invention.

FIG. 1 is a circuit block diagram showing a structure of an exchange system according to a first embodiment of the present invention. An exchanger 1 and a control data management device 2 are connected with each other through a communication line 3. The exchanger 1 comprises a line circuit 5 connected with a telephone terminal 4, a trunk circuit 7 connected with an office line 6, a trunk circuit 9 connected with a private line 8, a maintenance terminal I/F device 10 for containing the communication line 3 connected with the control data management device 2, control systems 12A and 12B which are multiplexed and serve to process exchange services, and a branch circuit 11 connected between the control systems 12A and 12B and the I/O circuits 5, 7, 9, and 10.

The line circuit 5 and the trunk circuits 7 and 9 are connected to the branch circuit 11 through a control bus 14 and a PCM highway 15, and the control systems 12A and 12B are connected to the branch circuit 11 through control buses 16 and 17 and PCM highways 18 and 19, respectively. The maintenance terminal I/F device 10 is connected to the branch circuit 11 only through the control bus 14.

The line circuit 5 converts a voice signal sent from the telephone terminal 4, into a PCM signal, and sends the PCM signal to the control systems 12A and 12B through the PCM highway 15 and the branch circuit 11. Also, the line circuit 5 converts a PCM signal sent through the PCM highway 15 from the control systems 12A and 12B, into a voice signal, and sends the voice signal to the telephone terminal 4. A control signal for monitoring the status of the telephone terminal 4 and controlling a call is transmitted between the line circuit 5 and the control systems 12A and 12B through the control bus 14, the branch circuit 11, and the control buses 16 and 17.

The trunk circuits 7 and 9 convert a voice signal sent from the office line 6 or the private line 8, into a PCM signal, and sends the PCM signal to the PCM highway 15. Also, the trunk circuits 7 and 9 convert a PCM signal sent through the PCM highway 15, into a voice signal, and sends the voice signal to the office line 6 or the private line 8. A control signal for monitoring the status of the office line 6 and private line 8 and for controlling a call is transmitted between the trunk circuits 7 and 9 and the control systems 12A and 12B through the control bus 14, the branch circuit 11, and the control buses 16 and 17.

The maintenance terminal I/F device 10 is connected with the control data management device 2 through the communication line 3, and serves as a junction for transmitting control data between the control data management device 2 and the control systems 12A and 12B. The communication line 3 may be practiced in the form of a serial communication path such as an RS-232C, an Ethernet, an analogue public network, or a digital public network, or a parallel communication path.

The branch circuit 11 is a device by which control buses and PCM highways connected with a control system set for an active system are connected with the control bus 14, and the PCM highway 15. For example, if the control system 12A is set for an active system, the branch circuit 11 connects the control bus 16 and the PCM highway 18 with the control bus 14 and the PCM highway 15, respectively.

Each of the control systems 12A and 12B comprises a peripheral communication device 121, an exchange switch 122, an exchange controller 123, an intersystem communication device 124, a memory 125 and an external storage device 126.

The peripheral communication device 121 transmits control information through the control buses 14 and 16 between the line circuit 5, the trunk circuits 7 and 9, and the maintenance terminal I/F device 10. Specifically, peripheral communication device 121 receives control information sent from the line circuit 5, the trunk circuits 7 and 9, and the maintenance terminal I/F device 10, and then, sends the information to the exchange controller 123. Also, the peripheral communication device 121 receives control information from the exchange controller 123, and then, sends the information to specified one of the line circuit 5, the trunk circuits 7 and 9, and the maintenance terminal I/F device 10.

The exchange switch 122 is connected with the PCM highway 18, and carries out exchange processing by changing time slots on the PCM highway 18 on the basis of an instruction from the exchange controller 123.

The exchange controller 123 is a controller which provides exchange services by controlling the exchange switch 122 in accordance with a dial number or an exchange service request supplied from the line circuit 5 and the trunk circuits 7 and 9.

The intersystem communication device 124 is a communication device for transmitting a request for changing control data and information of calling in an active system, through an intersystem communication path 20, between control systems each other. The intersystem communication path 20 includes a common memory, a parallel communication path, or a serial communication path such as an Ethernet, which is used for making communication between control systems each other.

The memory 125 serves to temporarily store various information necessary for the exchange controller 123 to make various processing.

The external storage device 126 serves to subsidiarily record an exchange program or to store arbitrary information such as obstacle information or the like, with use of a floppy disc (FD), a hard disc (HD), or the like. By the external storage device 126, for example, control data held on the memory 125 is periodically copied for back-up.

The control data management device 2 stores and manages control data necessary for the control systems 12A and 12B to carry out exchange processing, and also, is used for changing control data by a maintenance man of the exchange system. The control data management device 2 comprises a display 21, a keyboard 22 as an input device, a central control device (CPU) 23 for controlling the display 21 and the keyboard 22 and for retrieving control data, a memory 24 for storing control data, and an external storage device 25 for subsidiarily recording control data with use of a FD, a HD, or the like, and a communication device 26 for making communication with the exchanger 1.

Figure 2A:
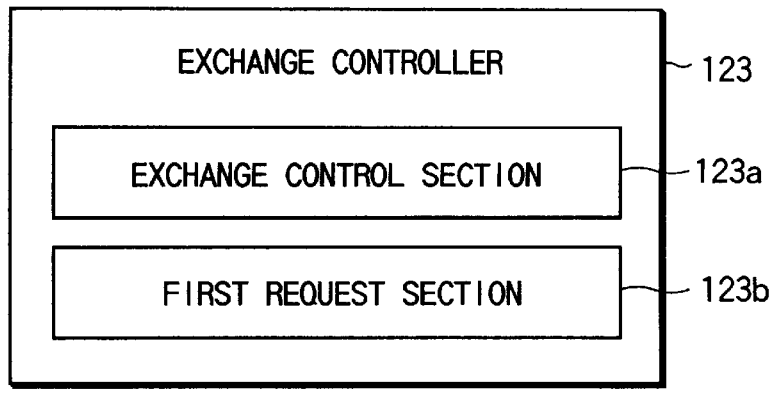
FIG. 2A is a view showing a structure of an exchange controller of a control system in the exchange system according to the first embodiment of the present invention.
Figure 2B:
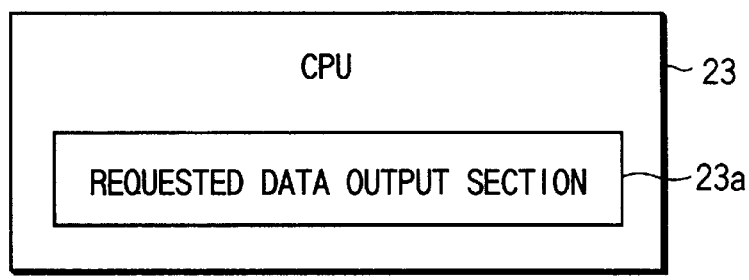
FIG. 2B is a view showing a structure of a central control device of the data management device in the first embodiment of the present invention.

The exchange controllers 123 of the control systems 12A and 12B and the CPU 23 of the control data management device 2 are constructed as shown in FIGS. 2A and 2B.

For example, an exchange controller 123 includes a microcomputer as a main control section, and also includes an exchange control section 123a and a first request section 123b as shown in FIG. 2A, in addition to a known control section generally used in an exchange system. These sections are realized in the form of software processing.

The exchange control section 123a controls the exchange switch 122, line circuit 5, trunk circuits 7 and 9, and maintenance terminal I/F device 10, based on control data corresponding to an exchange service to be provided.

The first request section 123b requests the control data management device 2 to output control data necessary for an exchange service to be performed. Specifically, at the time point when an exchange service requires is received through the line circuit 5, the first request section 123a issues an acquirement request for control data to the control data management device 2.

Meanwhile, the CPU 23 includes a microcomputer as a main control section, and also includes a requested data output section 23a, as shown in FIG. 2B. This section is realized in the form of software processing.

The requested data output section 23a sends corresponding control data to the exchanger 1, in response to an acquirement request for control data from the exchanger 1. Specifically, when a control data output request reaches through the communication line 3, the requested data output section 23a reads corresponding control data from the memory 24 or the external storage device 25, and sends the control data to the exchanger 1.

Figure 3:
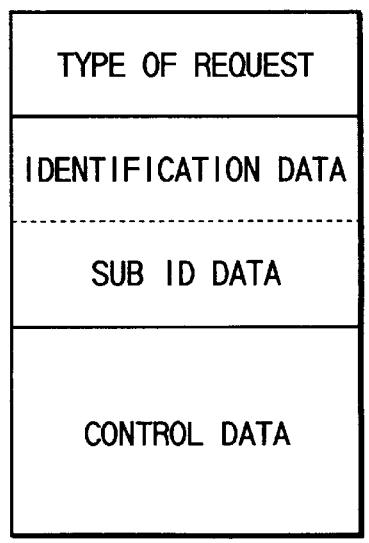
FIG. 3 is a diagram showing an example of the structure of control data transmitted between the exchanger and the control data management system in the first embodiment.

FIG. 3 is a view showing an example of a structure of control information transmitted between the exchanger 1 and the control data management device 2. As shown in FIG. 3, control information includes an area for the type of request, an area for identification data (added with sub ID data if necessary), and an area for control data.

The type of request is data representing a type of operation such as an acquirement for control data, a change thereof, a response to an acquirement, or a response to a change. The identification data is data such as serial numbers previously designated to types of control data, respectively, which enable uniform identification of types of various control data. If a certain specified type of control data includes a plurality of data items and one of the control data items is specified, e.g., if operation is performed on a certain type of control data of a certain telephone terminal, sub ID data is used to specify the control data item. The area for control data is used to notify control data read out if the type of operation is of an acquirement response. The area for control data is used to notify a value of control data to be changed, if the type of operation is of a change. Further, the area for control data is used to notify a value into which control data is changed, if the type of operation is a change response.

Next, operation of the exchange system according to the first embodiment, constructed as described above, will be explained in accordance with a processing procedure of the exchange controller 123 in the exchanger 1 and the CPU 23 in the control data management device 2.

The exchange controller 123 starts exchange processing upon receipt of a control request or an exchange request for a call, sent from the line circuit 5 and trunk circuits 7 and 9 through the branch circuit 11 and the peripheral communication device 121. In the beginning of the exchange processing, an acquirement operation for obtaining control data necessary for providing an exchange service corresponding to the request is started.

Specifically, the exchange controller 123 prepares control data acquirement request in which an acquirement is set as the type of request of control data information as shown in FIG. 3 and identification data and sub ID data are set so as to corresponding to the control data information to be referred to, and sends the request to the CPU 23 (step Sa2).

Upon reception of the control data acquirement request (step Sa6), the CPU 23 retrieves control data specified by the control data acquirement request, from the memory 24 or the external storage device 25 (step Sa7). Subsequently, the CPU 23 reads the retrieved control data, from the memory 24 or the external storage device 25 (step Sa8), and controls the communication device 26 so as to send the control data to the exchanger 1 (step Sa9).

Upon reception of the control data sent from the control data management device 2 through the communication line 3, the exchange controller 123 of the exchanger 1 controls the memory 125 so as to temporarily store the control data (step Sa3). Thereafter, the exchange controller 123 reads the control data from the memory 125 (step Sa4), and thus, a series of control data acquirement operation ends (step Sa5).

After completion of the control data acquirement operation, the exchange controller 123 controls respective sections to provide an exchange service, with use of control data read from the memory 125 in the step Sa4 as described above.

As has been explained above, according to the first embodiment, the control data management device 2 is added to the exchanger 1 which provides exchange services. Further, in response to a request for a service, control data necessary for providing the service is sent from the control data management device 2 to the exchanger 1. Therefore, all the control data needs not be previously stored in the exchanger 1. Accordingly, it is possible to prevent an increase of the memory capacity in the exchanger 1 in accordance with an increase in number of exchange services.

Further, in case where control systems are multiplexed in the conventional system, all the control data must be maintained each of the control systems 12A and 12B, so that each of the control systems 12A and 12B must be provided with the memory of a large capacity. However, according to the present embodiment, the memory 25 having a large capacity needs to be provided only in the control data management device 2, so that each of the control system 12A and 12B requires only the memory 125 having a capacity enough to store operation data necessary for one operation. Accordingly, the size of the memory of the entire system can be reduced.

Other embodiments of the present invention will be explained below. In the following embodiments, those portions which correspond to the portions of the first embodiment will be referred to by the same reference numerals, and detailed explanation thereof will be omitted.

Second Embodiment

The first embodiment is advantageous in that the memory capacity of the exchanger 1 can be prevented from being increased in accordance with an increase in number of exchange services. However, since control data must be acquired every time when an exchange service request issues, the efficiency is somewhat lowered. The second embodiment shows an example which improves the lowered efficiency.

Figure 5:
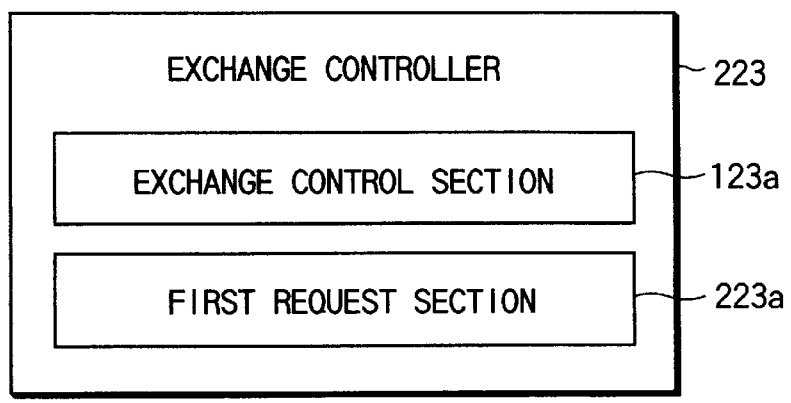
FIG. 5 is a view showing a structure of an exchange controller of the control system of the exchanger according to a second embodiment of the present invention.

The exchange system according to the present embodiment has a structure substantially similar to that of the first embodiment, except that an area for storing control data acquired is maintained in the memory 125 in each of the control systems 12A and 12B and that the exchange controller 123 is replaced with an exchange controller 223 shown in FIG. 5.

As shown in FIG. 5, the exchange controller 233 includes the exchange control section 123a (which is the same as that in the first embodiment) and a first request section 223a, as shown in FIG. 5, in addition to a known control section conventionally used in an exchange system. These sections are realized in the form of software processing.

The first request section 223a requests the control data management device 2 to output control data which is not stored in the memory 125, among control data necessary for an exchange service to be performed by the exchange controller 223. A determination as to whether or not specified control data is stored in the memory 125 is made on the basis of management information shown in FIG. 6. The management information is a database added with information (represented as acquired or not acquired) indicating whether or not control data has been acquired by the control system 12 (i.e., whether or not control data is stored in memory 125), in association with identification data or sub ID data of every item of control data.

Specifically, at the time point of a reception of an exchange service request through the line circuit 5, a determination is made on the basis of the management information as described above, as to whether or not a corresponding control data item has been acquired. The control data management device 2 is requested to output a control data item which is determined as not having been acquired.

Figure 7:
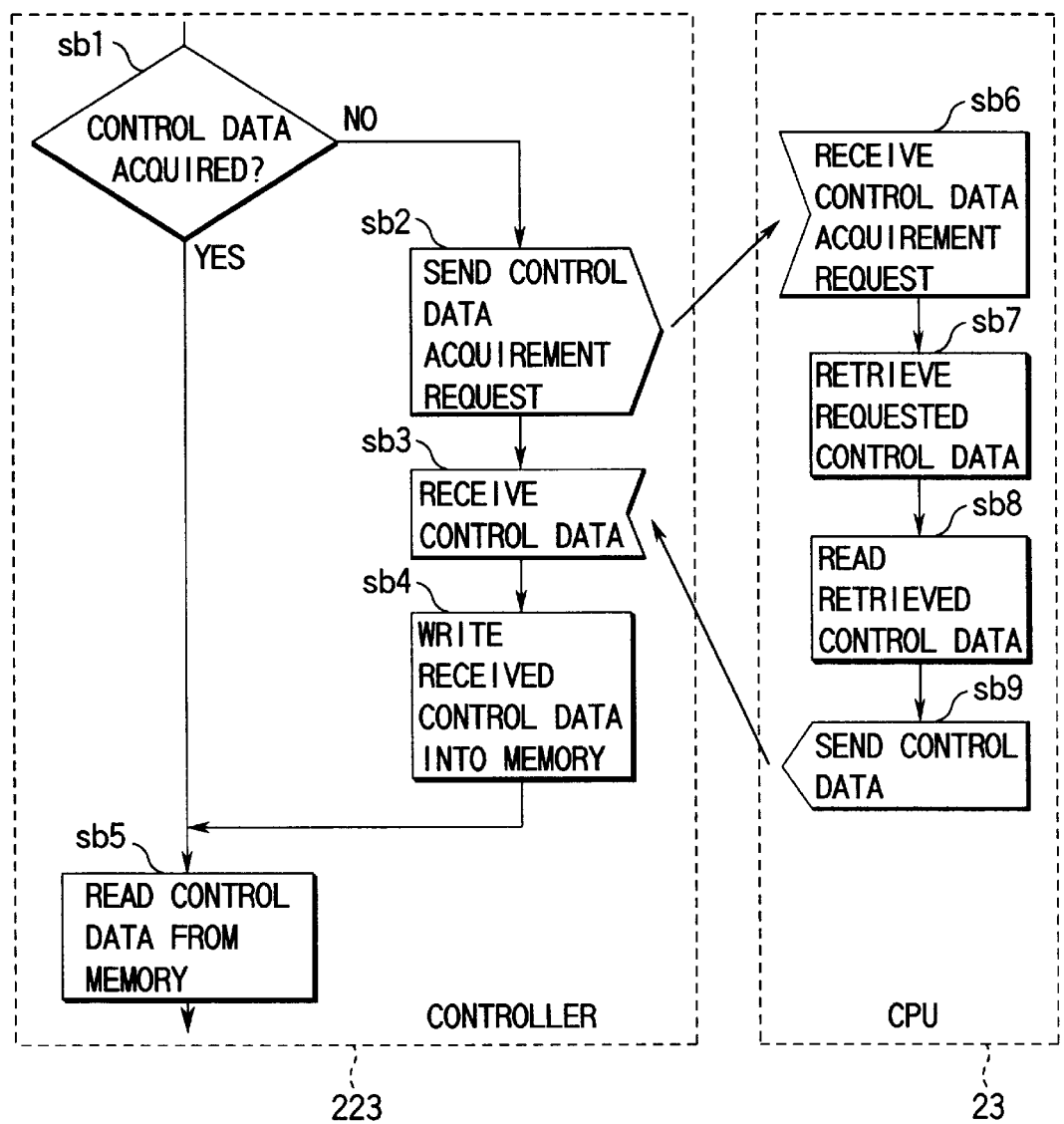
FIG. 7 is a flowchart showing a control procedure of the second embodiment according to the present invention.

Next, operation of the exchange system constructed as described above will be explained on the basis of a processing procedure of the exchange controller 223 in the exchanger 1 and the CPU 23 in the control data management device 2 shown in FIG. 7.

Upon receipt of a control request for a call or an exchange service request sent from the line circuit 5 and trunk circuits 7 and 9 through the branch circuit 11 and the peripheral communication device 121, the exchange controller 223 makes a determination as to whether or not a corresponding data item has been acquired (step Sb1). If it is determined that a corresponding control data has not been acquired (NO), the exchange controller 223 starts an operation for acquiring the control data item. Specifically, the exchange controller 223 prepares a control data acquirement request in which an acquirement is set as the type of request of control data information shown in FIG. 3 and identification data and sub ID data are set so as to correspond to the control data item to be acquired, and the exchange controller 223 sends the request to the CPU 23 (step Sb2).

Upon receipt of the control data acquirement request, the CPU 23 sends the control data item through the same procedure as in the steps Sa6 to Sa9 of the first embodiment.

The exchange controller 223 receives the control data item (step Sb3) and immediately stores the control data item into the memory 125 (step Sb4). Thereafter, the exchange controller 223 reads the control data item from the memory 125 (step Sb5), and provides an exchange service.

Meanwhile, if it is determined in step Sb1 that the control data item has been acquired, the exchange controller 223 goes to step Sb5, reads the control data item from the memory 125, and provides an exchange service.

Thus, in the present embodiment, the control data item acquired by the exchange controller 223 is stored into the memory 125. When an acquirement request for a control data item issues, a determination is made as to whether or not the control data item has been acquired and stored in the memory 125, and only such a control data item which has not been stored in the memory 125 is acquired from the control data management device 2. Therefore, it is possible to avoid labor for acquiring control data items once acquired, from the control data management device 2. Accordingly, control data items can be acquired with a high efficiency, contributing to an improvement in through-puts.

The storage area for control data items in the memory 125 may have a capacity enough to several control data items acquired recently. Accordingly, the size of the memory of the entire system may be slightly larger than that of the first embodiment, but is much smaller than that of a conventional system.

Third Embodiment

In the second embodiment, it has been supposed that only one control data item corresponds to an exchange service to be provided. In this case, whether or not the control data item has been acquired or not is determined only for one time. Depending on kinds of exchange services, there may be a case that a plurality of types of control data items are required, and it is impossible to directly adopt the processing procedure according to the second embodiment. In the third embodiment, operation for acquiring control data where a plurality of types of control data items are required.

Figure 8:
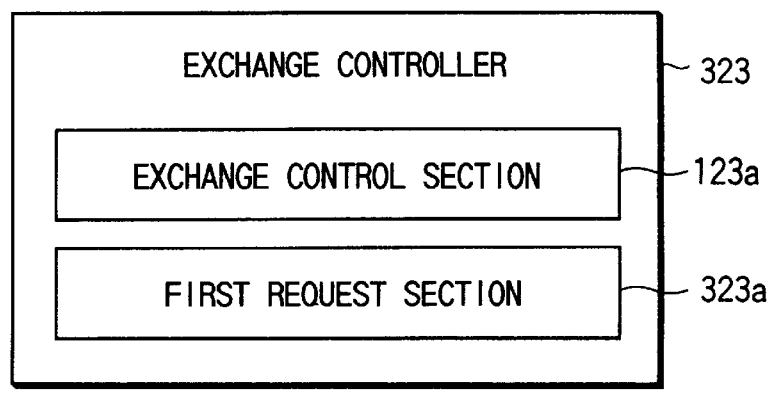
FIG. 8 is a view showing a structure of a control system of an exchanger according to a third embodiment of the present invention.

In the exchange system according to the present embodiment, the exchange controller 223 in the second embodiment is replaced with an exchange controller 323 shown in FIG. 8. Specifically, as shown in FIG. 8, the exchange controller 323 includes the same exchange control section 123a as those in the first embodiment and a first request section 323a.

The first request section 323a has a function of determining whether or not all specified control data items have been acquired, for every exchange service to be provided, in addition to the function of the first request section 223a.

Figure 9:
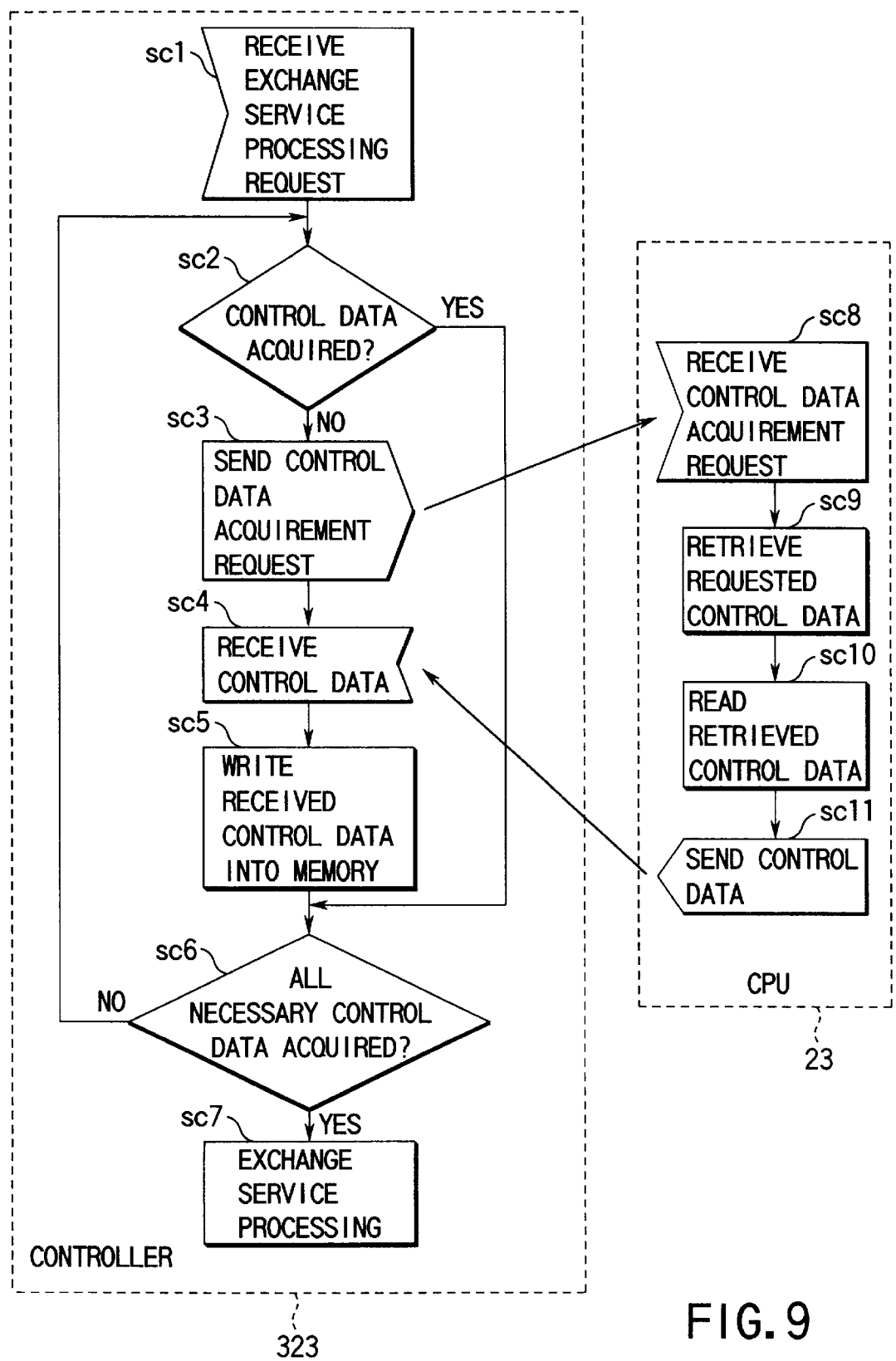
FIG. 9 is a flowchart showing a control procedure of the third embodiment according to the present invention.

Next, operation of the exchange system constructed as described above, according to the third embodiment, will be explained on the basis of a processing procedure of the exchange controller 323 and the CPU 23 shown in FIG. 9.

The exchange controller 323 receives a control request for a call or an exchange service request sent from the line circuit 5 and trunk circuits 7 and 9 through the branch circuit 11 and the peripheral communication device 121 (step Sc1). The exchange controller 323 makes a determination as to whether or not a certain type of control data item among corresponding data items has been acquired (step Sc2). If it is determined that the certain type of control data item has not been acquired (NO), the exchange controller 323 starts an operation for acquiring the type of control data item. Specifically, the exchange controller 323 prepares a control data acquirement request in which an acquirement is set as the type of request of control data information shown in FIG. 3 and identification data and sub ID data are set so as to correspond to the control data item to be acquired, and the exchange controller 323 sends the request to the CPU 23 (step Sc3).

Upon receipt of the control data acquirement request, the CPU 23 sends the control data item through the same procedure (steps Sc8 to Sc11) as in steps Sa6 to Sa9 of the first embodiment.

The exchange controller 323 receives the control data item (step Sc4) and immediately stores the control data item into the memory 125 (step Sc5). Subsequently, step Sc6 starts.

Meanwhile, if it is determined in step Sc1 that the control data item has been acquired (YES), the exchange controller 323 immediately goes to step Sc6.

In step Sc6, the exchange controller 323 determines whether or not control data items necessary for a service to be provided have been acquired, as to all the types of control data items. Specifically, if it is determined in step Sc6 that specified control data items have been acquired as to all the types of control data items (YES), the exchange controller 323 reads the control data item from the memory 125, and immediately provides an exchange service (step Sc7). Meanwhile, if it is determined that specified control data items have not been acquired (NO), the exchange controller 323 goes back again to step Sc2, the same procedure as described above is repeated.

Thus, according to the third embodiment, whether or not control data items to be acquired have been acquired as to all the types of control data items is determined by the exchange controller 323. Therefore, even when a plurality of types of control data items are required, control data items can be securely and quickly acquired, contributing to an improvement in reliability.

Fourth Embodiment

Although the above embodiments are advantageous in that the memory capacity can be prevented from being increased in accordance with an increase in number of exchange services, an acquiring operation must be carried out for a basic control data item which is used in common to a plurality of exchange services, when a request for an exchange service issues or every time when a request issues. The acquiring operation is thus wasteful. Therefore, the following explanation will be made of an embodiment in which a basic control data item described above, such as a control data item necessary for carrying out a service like a predetermined communication between two persons, is automatically acquired, for example, when turning on the power of an exchange system or starting an exchange system.

Figure 10:
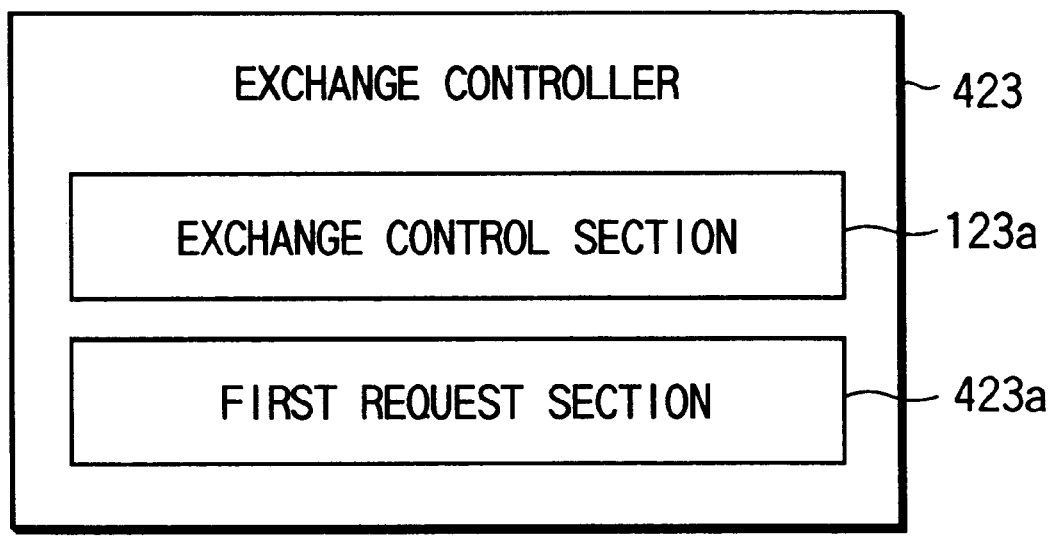
FIG. 10 is a view showing a structure of a control system of an exchanger according to a fourth embodiment of the present invention.
Figure 11:
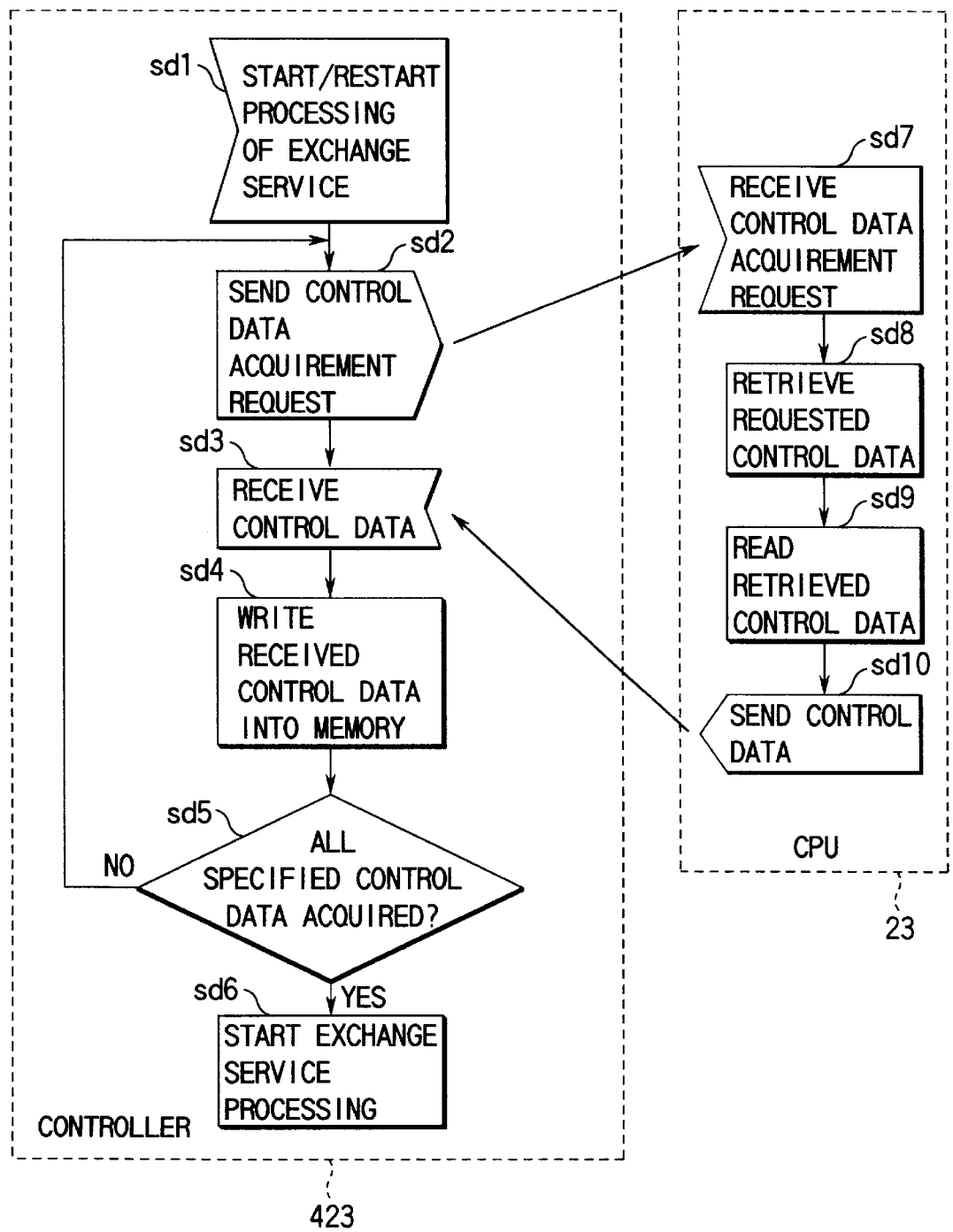
FIG. 11 is a flowchart showing a control procedure of the fourth embodiment according to the present invention.

In the exchange system according to the fourth embodiment, the exchange controller 323 of the third embodiment is replaced with an exchange controller 423 shown in FIG. 10. Specifically, as shown in FIG. 10, the exchange controller 423 includes the exchange control section 123a (which is the same as that in the first embodiment) and a first request section 423a.

The first request section 423a has a function of requesting the control data management device 2 to output a predetermined control data item when turning on the power of the control system 123 or starting the control system 123, in addition to the function of the first request section 323a described above.

Next, operation of the exchange system constructed as described above, according to the fourth embodiment, will be explained on the basis of a processing procedure of the exchange controller 423 shown in FIG. 9 and the CPU 23.

When the power of the system is turned on or the system is re-started, the exchange controller 423 performs start/re-start processing of an exchange service, regardless of whether the control system of itself is set as an active system or a stand-by system (step Sd1). Next, the exchange controller 423 automatically sends an acquirement request for a certain control data item (step Sd2). Combinations of control data items to be acquired are predetermined in the form of a table as shown in FIG. 12, and the exchange controller 423 specifies a control data item to be acquired, on the basis of the table.

Thereafter, the control data item is acquired in accordance with the same procedure (steps Sd7 to Sd10) as in steps Sa6 to Sa9 in the first embodiment, and a received control data item is written into the memory 125 (step Sd4). Then, the exchange controller 423 determines whether or not all the required control data items have been acquired. If not (NO), the exchange controller 423 goes back again to step Sd2, and the successive operation is repeated. If it is determined that all the specified control data items have been acquired (YES), the exchange controller 423 goes to step Sd6 and starts an exchange service (step Sd6).

Thus, in the fourth embodiment, minimum necessary control data items are read when the memories of the control systems 12A and 12B are reset, e.g., when restarting the system. These control data items are used for exchange services. As a result, the control data items which must be newly obtained upon receipt of an exchange service are reduced, so that the time required for an acquiring operation for acquiring control data items can be shortened. Accordingly, it is possible to shorten the time from when a request for an exchange service issues to when the exchange service is actually started. In addition, according to the fourth embodiment, an exchange control system 423 automatically acquires predetermined control data items when turning on the power of the system or when starting the system, even if the control system itself is set as a stand-by system. Therefore, when a standby exchange control system is switched to an active system, processing for providing an exchange service can be started from a state in which predetermined control data items have already been acquired. Accordingly, the starting when the system is switched can be faster.

In the fourth embodiment, it has been supposed that the operation for acquiring predetermined control data items is carried out in both of an active and stand-by exchange controllers 423. However, only the active exchange controller may carry out the operation.

Fifth Embodiment

In practical operation, control data items stored in the exchanger 1 may be changed, for example, due to a change of an abbreviation number. The operation for such a change is made by the telephone terminal 4 connected to the line circuit 5. However, in this case, if a change is made only to a control data item stored in the memory 125 in the control system 12, the control data item stored in the memory 125 of the exchanger 1 differs from a corresponding control data item stored in the memory 24 of the control data management device 2. Therefore, the present invention shows an example which overcomes such a drawback.

In the exchange system of the fifth embodiment, the exchange controller 123 in the exchanger 1 shown in FIG. 1 is replaced with an exchange controller 523 shown in FIG. 13A and the CPU 23 in the control data management device 2 shown in FIG. 1 is replaced with a CPU 33 shown in FIG. 13B.

The exchange controller 523 includes, for example, a microcomputer as a main control section, and also includes the exchange control section 123a (which is the same as that in the first embodiment), a data rewrite command receiving section 523a, and a first control data rewrite section 523b, as shown in FIG. 13A, in addition to a known control section generally used in an exchange system. The respective sections are realized in the form of software processing.

The data rewrite command receiving section 523a receives a control data change request supplied through the line circuit and trunk circuits 7 and 9, and instructs the control data management device 2 of a control data item to be changed and the content of a change, in response to the control data change request.

The first control data rewrite section 523b performs rewriting of a corresponding control data item in the memory 125, in response to a notice from a first notification section 33b described later.

Meanwhile, the CPU 33 includes, for example, a microcomputer as a main control section, and also includes a first control data rewrite section 33a and a first notification section 33b, as shown in FIG. 13B. Note that these sections are realized in the form of software processing.

The first control data rewrite section 33a changes a control data item stored in the memory 24, in accordance with an instruction from the data rewrite command receiving section 523a.

The first notification section 33b notifies the control system 12 of a correct completion of a change to a control data item by the first control data rewrite section 33a.

Figure 14:
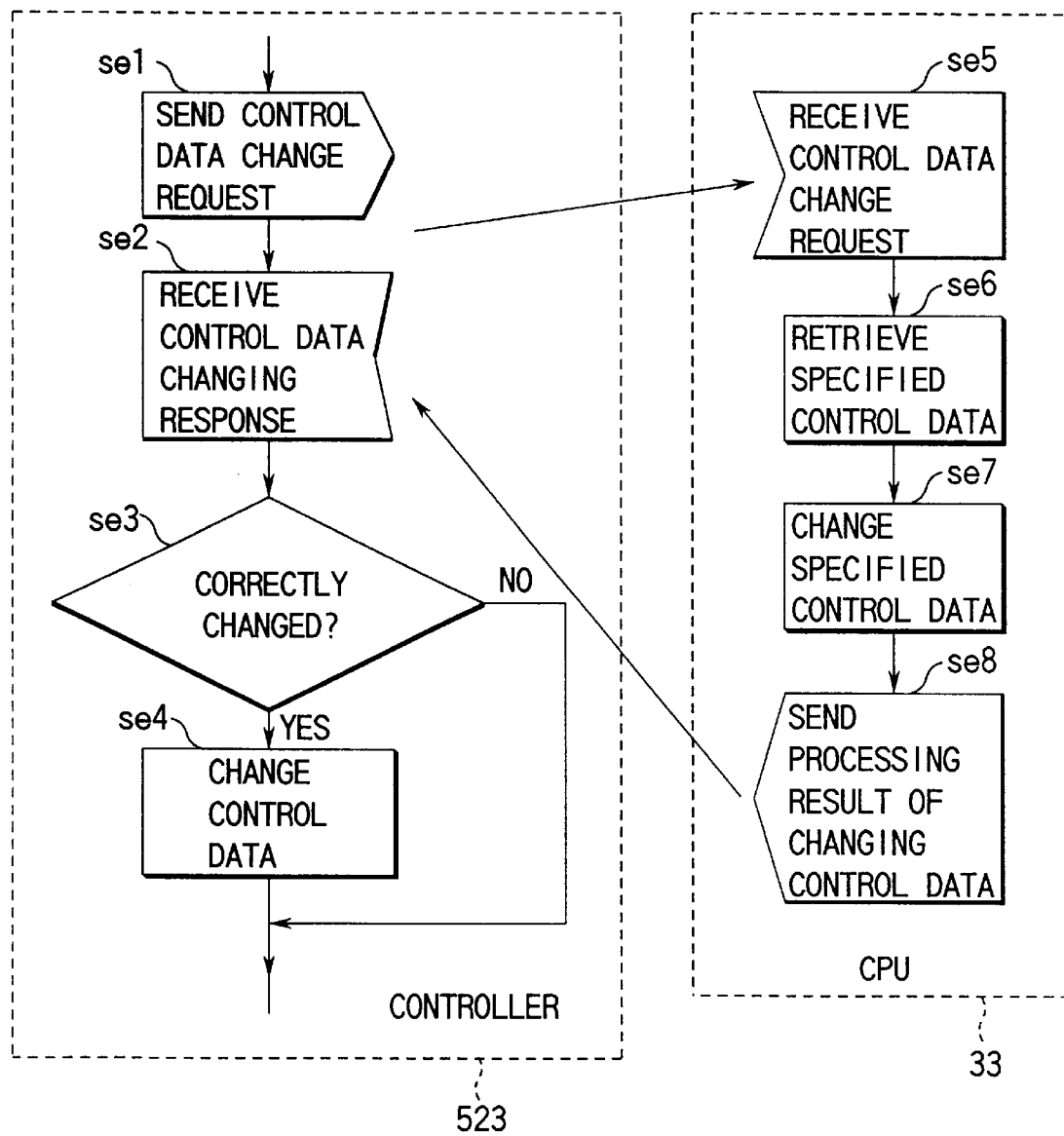
FIG. 14 is a flowchart showing a control procedure of the fifth embodiment according to the present invention.

Next, operation of the system constructed as above will be explained on the basis of a flowchart shown in FIG. 14.

For example, when a change operation for changing a control data item is made through the telephone terminal 4, the exchange controller 523 sends a change request of a control data item to the CPU 33 in the control data management device 2 (step Se1). Upon receipt of the change request (step Se5), the CPU 33 retrieves the specified control data item from the memory 24 (step Se6). Subsequently, a change operation for changing the specified control data item is performed (step Se7), and the processing result of the changing operation is sent as a control data change response to the exchange controller 123 (step Se8).

The exchange controller 523 determines whether or not a change has been correctly made to the control data item (step Se3). If it is determined that the data is correctly changed in step Se3, a change is made to a corresponding control data item in the memory 125 (step Se4).

Thus, according to the fifth embodiment, for example, in case where a change operation for changing a control data item is carried out through a telephone terminal 4, a corresponding control data item in the control data management device 2 is changed at first. After completion of the change, a corresponding control data item in the exchanger 1 is changed. As a result of this, it is possible to prevent a drawback that a control data item stored in the exchanger 1 differs from a corresponding data item stored in the control data management device 2. The sequence of changing the control data item is not limited to the above one, it is possible to change a control data item in the exchanger 1 at first and then change a corresponding control data item in the control data management device 2.

The fifth embodiment is based on a requisite of the structure of the second to fourth embodiments in which control data items are stored in a control system and are subjected to re-use, and also, the fifth embodiment is added with a function of changing a control data item stored in the control data management device 2 together with a control data item stored in the control system, in accordance with a change request for changing a control data item. However, the same structure is applicable to a case where control data items are not stored in the control system as in the first embodiment. In this case, a control data item to be changed is not stored in the control system, and therefore, the first notification section 33b and the first control data rewrite section 523b can be omitted or the second notification section 43b and the second control data rewrite section 623a can be omitted.

Sixth Embodiment

In practical operation, there may be a demand that change processing for changing a control data item should be directly made through the keyboard 22 in the control data management device 2. However, such a demand cannot be satisfied by the processing procedure according to the fifth embodiment. Therefore, the present embodiment shows a structure which enables change operation for directly changing a control data item in the control data management device 2.

Figure 15A:
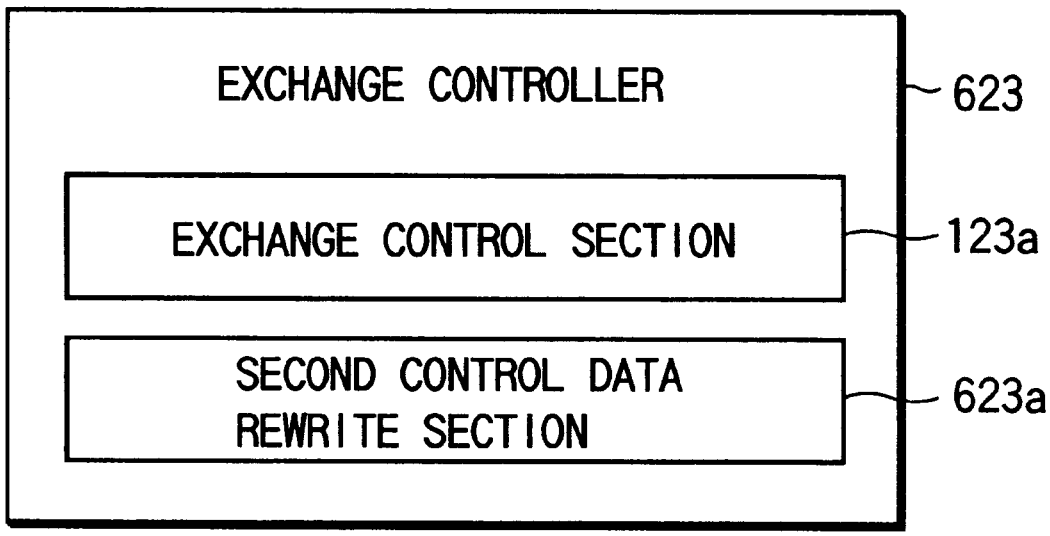
FIG. 15A is a view showing a structure of an exchange controller of a control system of an exchanger according to a sixth embodiment of the present invention.
Figure 15B:
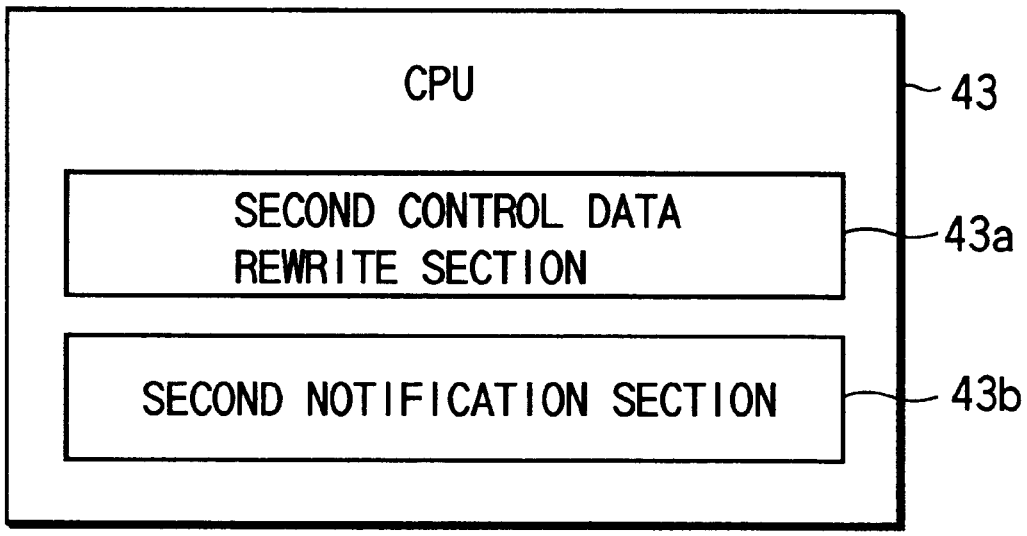
FIG. 15B is a view showing a structure of a central processing unit of a control data management device according to the sixth embodiment of the present invention.

In the exchange system according to the sixth embodiment, the exchange controller 123 in the exchanger 1 shown in FIG. 1 is replaced with an exchange controller 623 shown in FIG. 15A, and the CPU 23 in the control data management device 2 shown in FIG. 1 is replaced with a CPU 43 shown in FIG. 15B.

The exchange controller 623 includes, for example, a microcomputer as a main control section, and also includes the exchange control section 123a (which is the same as that in the first embodiment) and a second control data rewrite section 623a, as shown in FIG. 15A, in addition to a known control section generally used in the exchange system. These sections are realized in the form of software processing.

The second control data rewrite section 623a rewrites a corresponding control data item in the memory 125, in response to a notification from a second notification section 43b described later.

Meanwhile, the CPU 43 includes, for example, a microcomputer as a main control section, and also includes a second control data rewrite section 43a and a second notification section 43b, as shown in FIG. 15B.

The second control data rewrite section 43a receives a control data change request and changes a control data item stored in the memory 24, in accordance the control data change request.

The second notification section 43b notifies the exchanger 1 of correct completion of a change to a control data item by the second control data rewrite section 43a.

Figure 16:
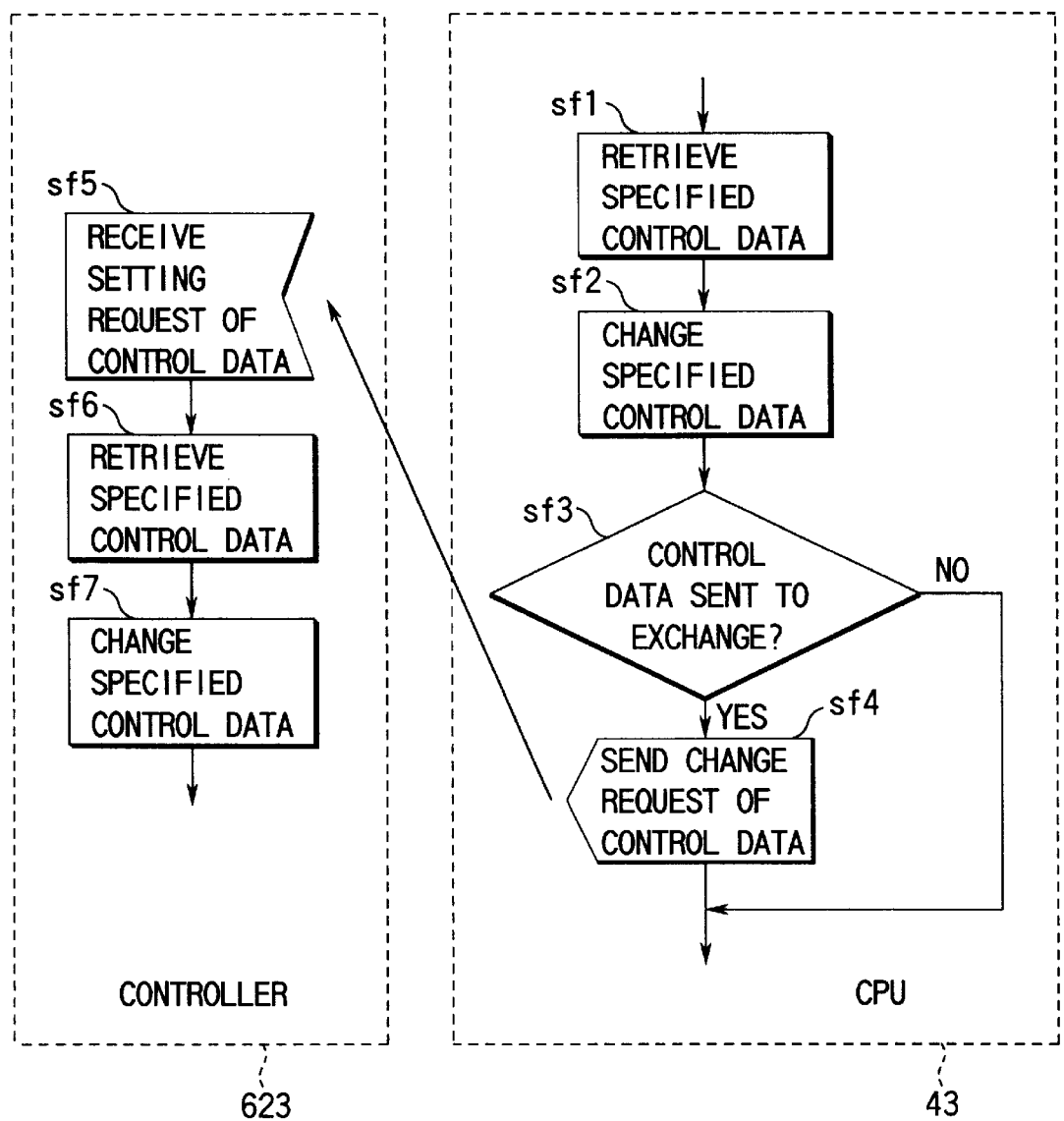
FIG. 16 is a flowchart showing a control procedure of the sixth embodiment according to the present invention.

Next, operation of the system constructed as above will be explained on the basis of a flowchart shown in FIG. 16.

Figure 4:
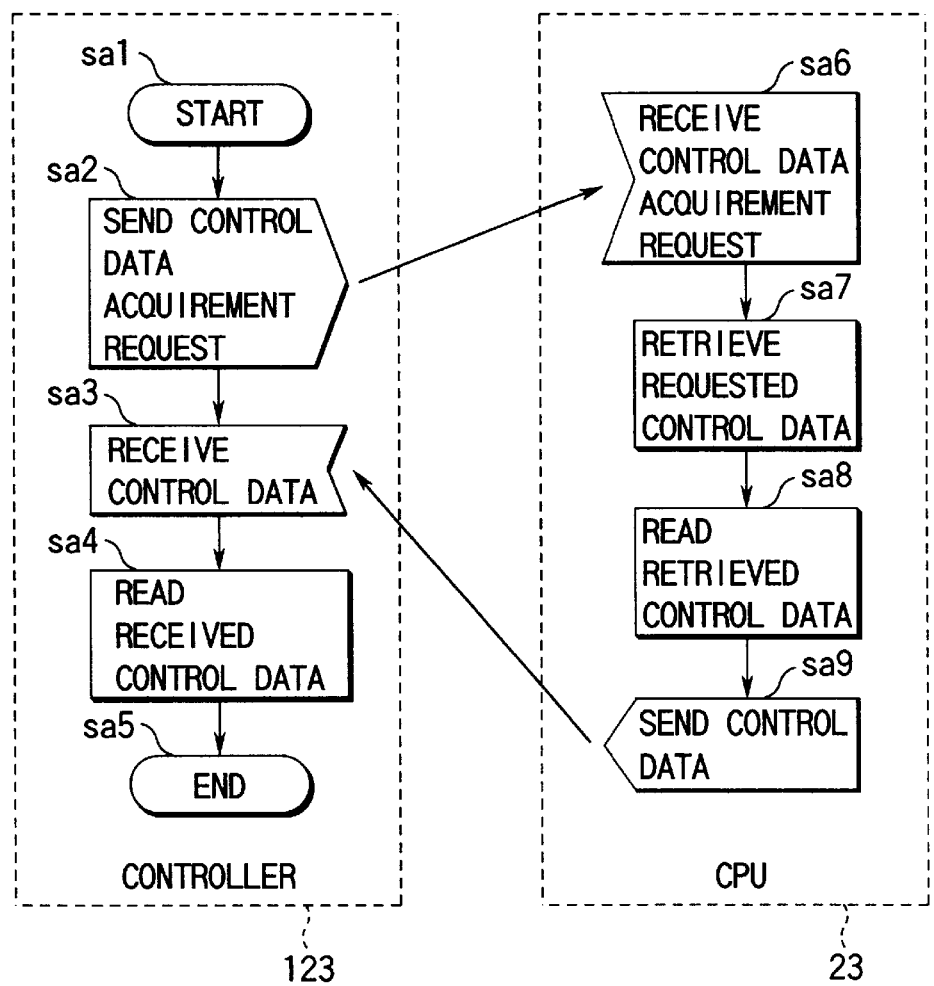
FIG. 4 is a flowchart showing a control procedure according to the first embodiment of the present invention.

For example, when a change operation for changing a control data item is made through a keyboard 22, the CPU 23 of the control data management device 2 retrieves a specified control data item from the memory 24 and the external storage device 25 (step Sf1), and subsequently makes a change to the specified control data item (step Sf2). Thereafter, the CPU 23 determines whether or not the control data item changed has already been sent to the exchanger 1 (step Sf3). This determination is made with use of the control data management information shown in FIG. 4. If it is determined as not having been sent (NO), the processing immediately ends.

Meanwhile, if it is determined as having been sent, the CPU 23 sends a change request for changing the control data item, to the exchange controller 123 of the exchanger 1 (step Sf4). The change request is usually sent to the exchanger when the data acquirement request is supplied from the exchanger 1 to the control data management device 2.

Upon receipt of the change request (or setting request) for changing the control data item (step Sf5), the exchange controller 623 retrieves a specified control data item from the memory 125 (step Sf6), and subsequently makes a change to the specified control data item (step Sf7).

Thus, according to the sixth embodiment, a change operation for changing a control data item stored in the control data management device 2 can be directly carried out by the control data management device 2, and also, a control data item stored in the control system 12 can be rewritten. Therefore, it is possible to prevent a difference from occurring between control data items corresponding to each other and respectively stored in the control data management device 2 and the control system 12.

The sixth embodiment is based on a requisite of the structure of the second to fourth embodiments in which control data items are stored in the control system and are subjected to re-use, and also, the present embodiment is added with a function of changing a control data item stored in the control data management device 2 together with a corresponding control data item stored in the control system 12 of the exchanger 1, in accordance with a change request for changing a control data item. However, the same structure is applicable to a structure in which control data items are not stored in the control system 12. In this case, a control data item to be changed is not stored in the control system, and therefore, the first notification section 33b and the first control data rewrite section 523b can be omitted or the second notification section 43b and the second control data rewrite section 623a can be omitted.

Seventh Embodiment

Figure 17:
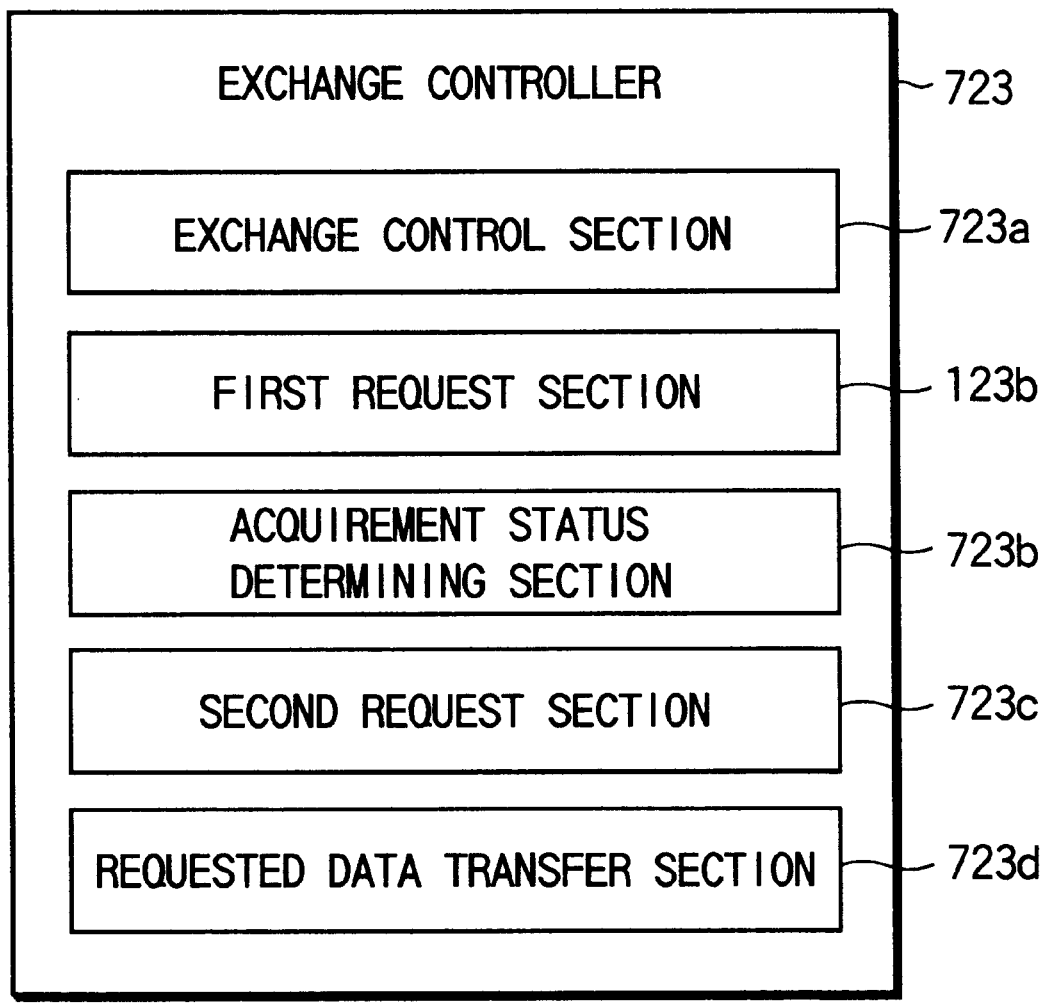
FIG. 17 is a view showing a structure of an exchange controller of a control system of an exchanger according to a seventh embodiment of the present invention.

In the exchange system of the seventh embodiment, the exchange controller 123 in the exchanger 1 shown in FIG. 1 is replaced with an exchange controller 723 shown in FIG. 17. Note that the CPU 23 comprises the requested data output section 23a, like in the first embodiment.

The exchange controller 723 includes, for example, a microcomputer as a main control section, and also includes an exchange control section 723a, the first request section 123b (which is the same as that in the first embodiment), an acquirement status determining section 723b, a second request section 723c, and a requested data transfer section 723d, in addition to a known control section generally used in an exchange system. The respective sections are realized in the form of software processing.

When a control data item is transferred by the requested data transfer section 723d, the exchange control section 723a controls the exchange switch 122, line circuit 5, trunk circuits 7 and 9, and maintenance terminal I/F device 10, on the basis of the control data item. In case where no control data item is transferred by the requested data transfer section 723d, the exchange control section 723a stops continuation of control.

The second request section 723c requests the control system as a stand-by system to send a corresponding control data item when the acquirement status determining section 723b determines that outputting of a control data item to the exchanger 1 has not been performed correctly.

When a control data requested by the second request section 723c is stored in the memory 125, the requested data transfer section 723d transfers the requested control data to the control system which requests the data.

Figure 18:
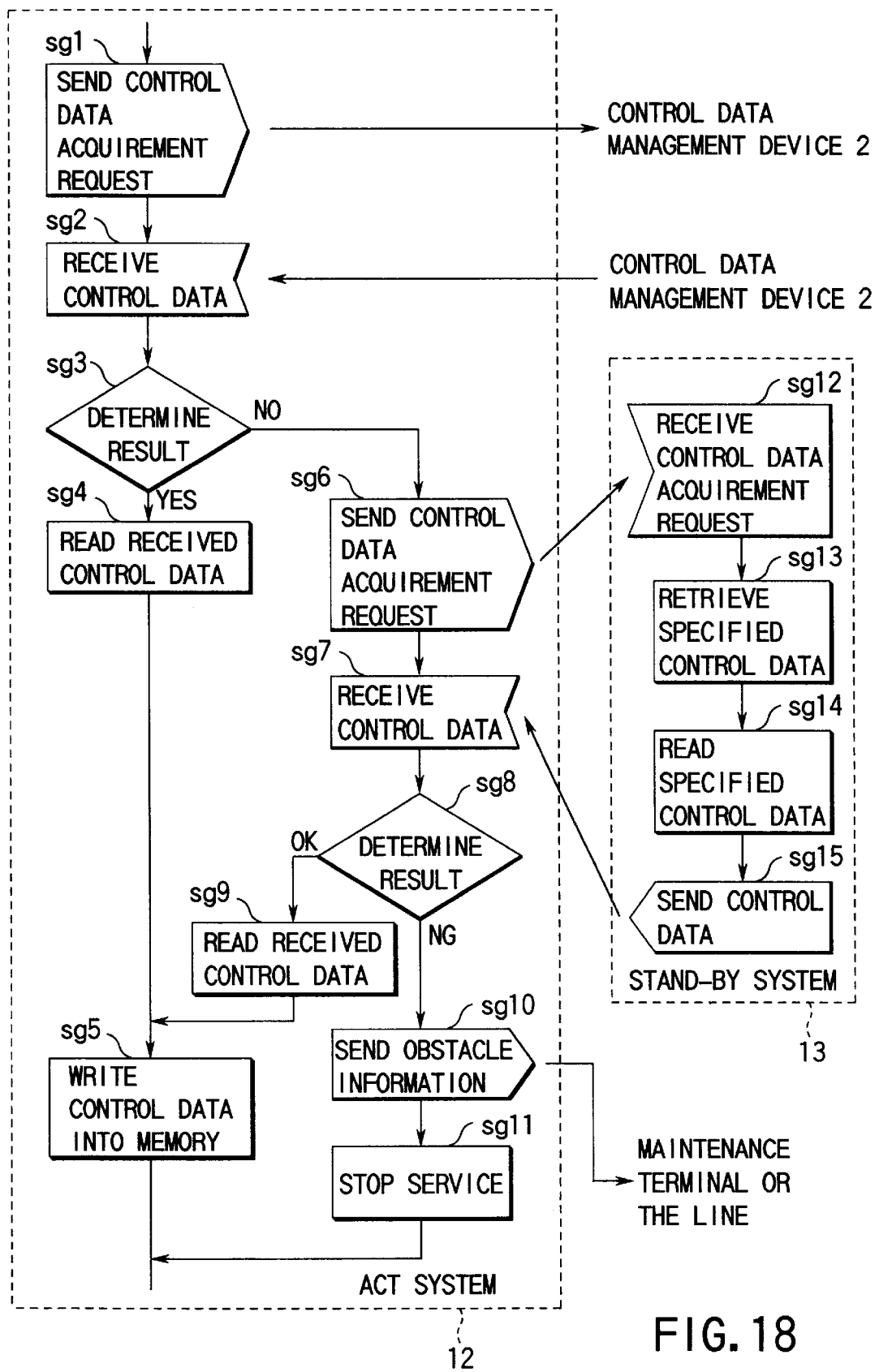
FIG. 18 is a flowchart showing a control procedure of the seventh embodiment according to the present invention.

Next, operation of the system constructed as above will be explained on the basis of a flowchart shown in FIG. 18. It is supposed that the control system 12A is an active system and the control system 12B is a standby system.

Firstly, the exchange controller 723 of the act control system 12A sends an acquirement request for a control data item to the control data management device 2 (step Sg1). The control data management device 2 sends a control data item to the exchanger 1 on the basis of a procedure described in the first embodiment. The exchange controller 723 receives the control data item sent from the control data management device 2 (step Sg2). Subsequently, the exchange controller 723 determines whether or not the acquirement status of the control data item is correct (step Sg3). If it is determined that the control data item has been acquired correctly (YES)., the exchange controller 723 of the control system 12A reads the received control data item (step Sg4), and subsequently writes the control data item into the memory 125 of the control system 12A (step Sg5).

If no requested control data item is received, e.g., in case where the communication line 3 is shut off, it is determined that a control data item has not been correctly acquired in step Sg3 (NO), and the exchange controller 723 of the control system 12A sends an acquirement request for a control data item to the control system 12B as a stand-by system (step Sg6).

Upon receipt of the control data acquirement request (step Sg12), the exchange controller 723 of the stand-by control system 12B retrieves a specified control data item designated by the control data acquirement request, from the memory 125 of the control system 12B (step Sg13). Subsequently, the exchange controller 723 of the control system 12B reads the retrieved control data item from the memory 125 (step Sg14), and controls the inter-system communication device 124 of the control system 12B so as to send the control data item to the control system 12A (step Sg15).

Upon receipt of the control data item (step Sg7), the exchange controller 723 of the control system 12A makes a determination as to a reception result (step Sg8). If it is determined that the requested control data item has been received correctly (OK), the exchange controller 723 of the control system 12A reads the received control data item (step Sg9), and writes the control data item into the memory of the control system 12A. Thereafter, the exchange controller 723 continues to provide exchange services.

Meanwhile, if the requested control data item has not been received correctly in step Sg8 (NG), the exchange controller 723 of the control system 12A sends obstacle information (step Sg10), and subsequently, stops providing exchange services (step Sg11).

As has been described above, according to the seventh embodiment, it is possible to continue to provide exchange services if a corresponding control data item is stored in the memory 125 in the control system as a stand-by system even though no control data item is acquired from the control data management device 2. This contributes to an improvement in reliability of the system.

Although the seventh embodiment is based on a requisite of the structure of the second embodiment, the seventh embodiment may be based on any of the structures according to third to sixth embodiments.

Eighth Embodiment

The eighth embodiment also shows an example of operation in case where a control data item is not acquired correctly from the control data management device 2, like in the seventh embodiment.

Figure 19:
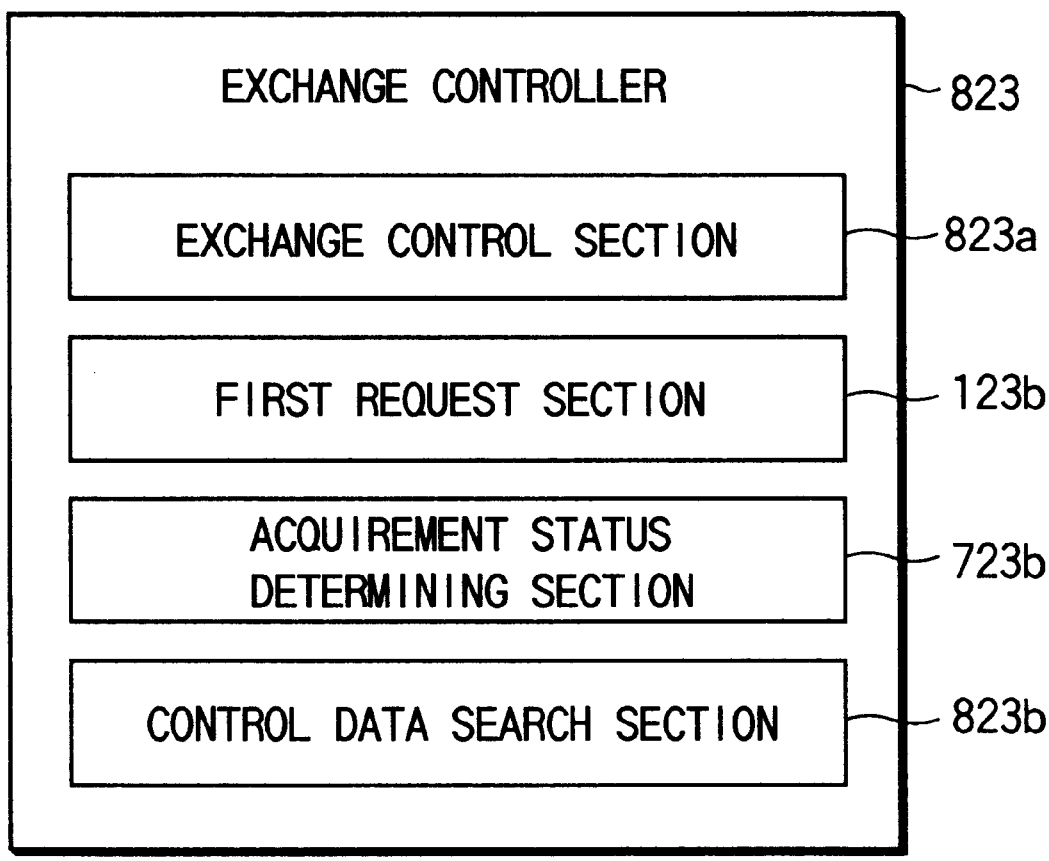
FIG. 19 is a view showing view showing a structure of an exchange controller of a control system of an exchanger according to an eighth embodiment of the present invention.

In the exchange system of the eighth embodiment, the exchange controller 123 in the exchanger 1 shown in FIG. 1 is replaced with an exchange controller 823 shown in FIG. 19. Note that the CPU 23 of the control data management device 2 comprises the requested data output section 23a, like in the first embodiment.

The exchange controller 823 includes, for example, a microcomputer as a main control section, and also includes an exchange control section 823a, the first request section 123b (which is the same as that in the first embodiment), the acquirement status determining section 723b (which is the same as that in the seventh embodiment), and a control data retrieve section 823b, in addition to a known control section generally used in an exchange system. The respective sections are realized in the form of software processing.

When a control data item is read by the control data retrieve section 823b, the exchange control section 823a controls the exchange switch 122, line circuit 5, trunk circuits 7 and 9, and maintenance terminal I/F device 10, on the basis of the control data item. In case where no control data item is read by the control data retrieve section 823b, the exchange control section 823a stops continuation of control.

If the acquirement status determine section 723b determines that outputting of a control data item to the exchanger 1 has not been performed correctly where the control system including the control data retrieve section 823b itself is set as an active system, the control data retrieve section 823b retrieves a corresponding control data item from control data items stored in the external storage device 126.

Figure 20:
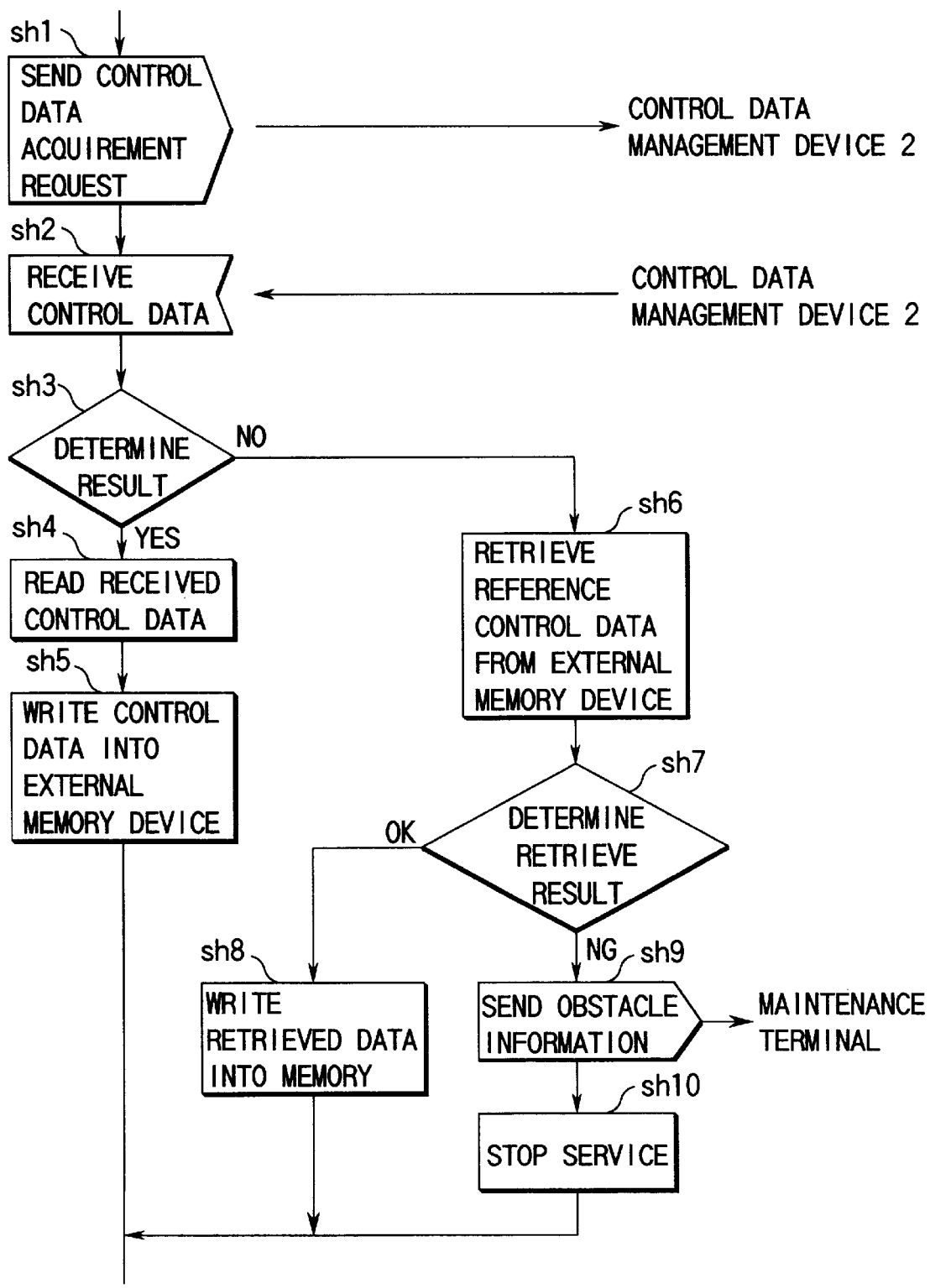
FIG. 20 is a flowchart showing a control procedure of the eighth embodiment according to the present invention.

Next, operation of the system constructed as above will be explained on the basis of a flowchart shown in FIG. 20.

The exchange controller 823 of the control system 12A sends an acquirement request for a control data item to the control data management device 2 (step Sh1). The control data management device 2 sends a control data item to the exchanger 1 on the basis of a procedure described in the first embodiment. The exchange controller 823 receives the control data item sent from the control data management device 2 (step Sh2). Subsequently, the exchange controller 823 determines whether or not the acquirement status of the control data item is correct (step Sh3). If it is determined that the control data item has been acquired correctly (YES), the exchange controller 823 of the control system 12A reads the received control data item (step Sh4), and subsequently writes the control data item into the external storage device 126 (step Sh5).

If no requested control data item is received, e.g., in case where the communication line 3 is shut off, it is determined that a control data item has not been correctly acquired in step Sh3 (NO), and the exchange controller 823 retrieves the control data item from the external storage device 126 (step Sh6). Subsequently, the exchange controller 823 determines the retrieve result (step Sh7). If it is determined that a requested control data item is stored in the external storage device 126 (OK), the exchange controller 823 writes the acquired control data item into the memory 125 (step Sh8), and continues to provide exchange services. Meanwhile, if it is determined that a requested control data item is not stored in the external storage device 126 (NG), the exchange controller 823 sends obstacle information (step Sh9), and subsequently stops providing exchange services (step Sh10).

As has been described above, according to the eighth embodiment, it is also possible to continue to provide exchange services if a corresponding control data item is stored in the external storage device 126 in the control system as an active system even though no control data item is acquired from the control data management device 2. This contributes to an improvement in reliability of the system.

Although the eighth embodiment is based on a requisite of the structure of the second embodiment, the eighth embodiment may be based on any of the structures according to third to seventh embodiments.

Ninth Embodiment

In an exchange system in which control systems are multiplexed as in the embodiments described above, an exchange program is updated in the following manner, in several cases. While continuing to provide exchange services based on an exchange program of an old version by a control system as an active system, an updating operation for an exchange program of a new version is carried out in a control system as a stand-by system. After completion of the updating operation, the active system and the stand-by system are switched inversely, to start providing exchange services based on the exchange program of a new version. In this manner, the time period for which exchange services are stopped can be shortened.

However, in case where two control systems 12A and 12B posses a common control data item stored in the control data management device 2 as in the first embodiment, control data items for both the new and old versions must be stored in the control data management device 2 if programs of new and old versions respectively adopt control data formats different from each other. Therefore, in this case, it is necessary to prepare a memory capacity for the control data management device 2, which is much (twice) larger than the memory capacity required for normal operation.

The memory capacity needs not be increased if control data items stored in the control data management device 2 is updated so as to correspond to an exchange program of a new version when the control system in which an exchange program of a new version set is switched to be an active system. However, provision of exchange services will then be stopped for a longer time period.

Therefore, an embodiment provided with a means for avoiding a drawback as described above will be explained below.

Figure 21A:
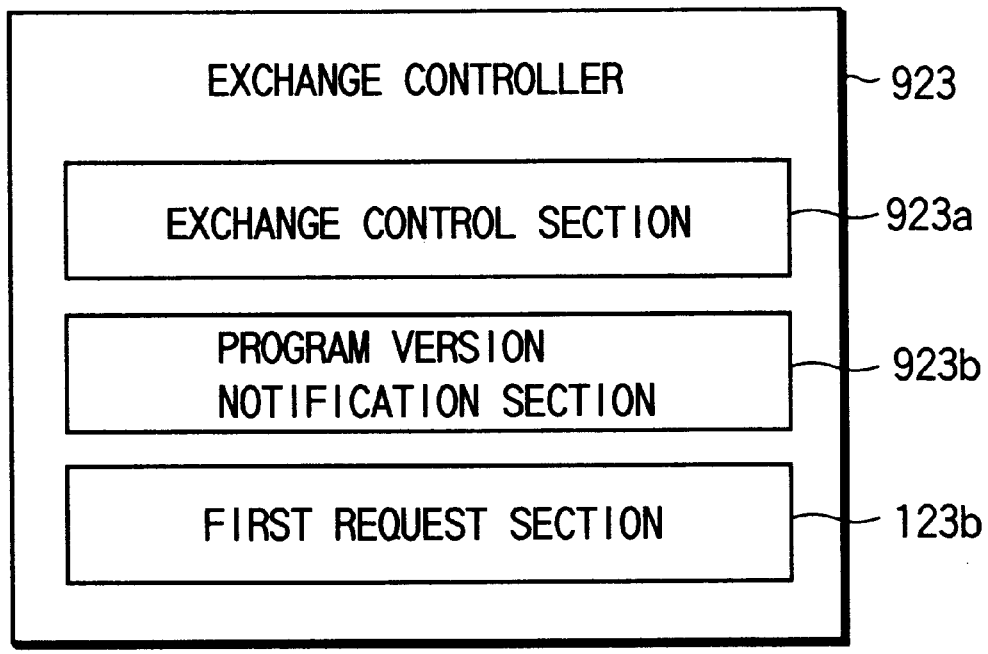
FIG. 21A is a view showing a structure of an exchange controller of an exchanger according to a ninth embodiment of the present invention.
Figure 21B:
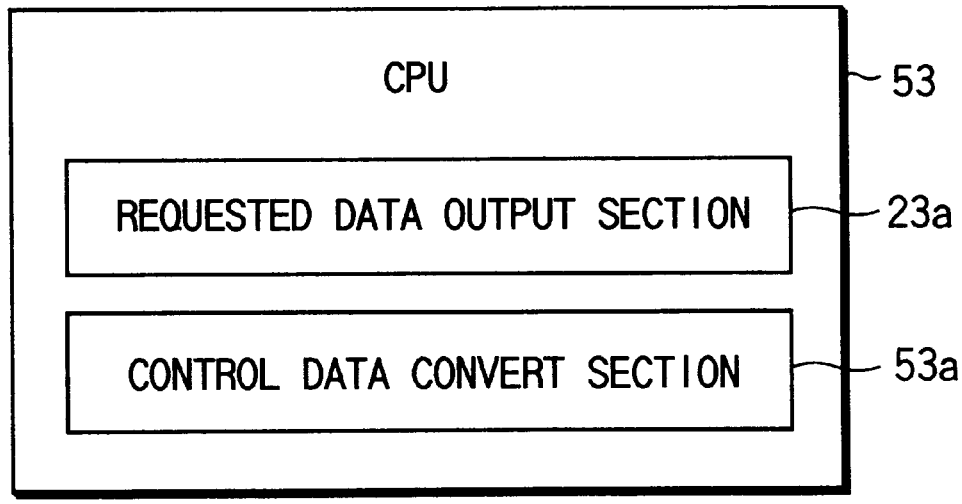
FIG. 21B is a view showing a structure of a central processing unit of a control data management device according to the ninth embodiment of the present invention.

The exchange system according to the present embodiment, the exchange controller 123 in the exchanger 1 shown in FIG. 1 is replaced with an exchange controller 923 shown in FIG. 21A and the CPU 23 in the control data management device 2 shown in FIG. 1 is replaced with a CPU 53 shown in FIG. 21B.

The exchange controller 923 includes, for example, a microcomputer as a main control section, and also includes an exchange control section 923a, a program version notification section 923b, and the first request section 123b (which is the same as that in the first embodiment), in addition to a known control section generally used in an exchange system. The respective sections are realized in the form of software processing.

The exchange control section 923a stores an exchange program which can be updated, to control the exchange switch 122, line circuit 5, trunk circuits 7 and 9, and maintenance terminal I/F device 10.

The program version notification section 923b notifies the control data management device 2 of a type of an exchange program used by the exchange control section 923a.

Meanwhile, the CPU 53 includes, for example, a microcomputer as a main control section, and also includes the requested data output section 23a (which is the same as that in the first embodiment) and a control data conversion section 53a as shown in FIG. 21B. These sections are realized in the form of software processing.

The control data conversion section 53a converts a control data item requested from the first request section 123b, into a format corresponding to the type notified by the program version notification section 923b, and makes the requested data output section 23a output the control data item to the exchanger 1.

Figure 22:
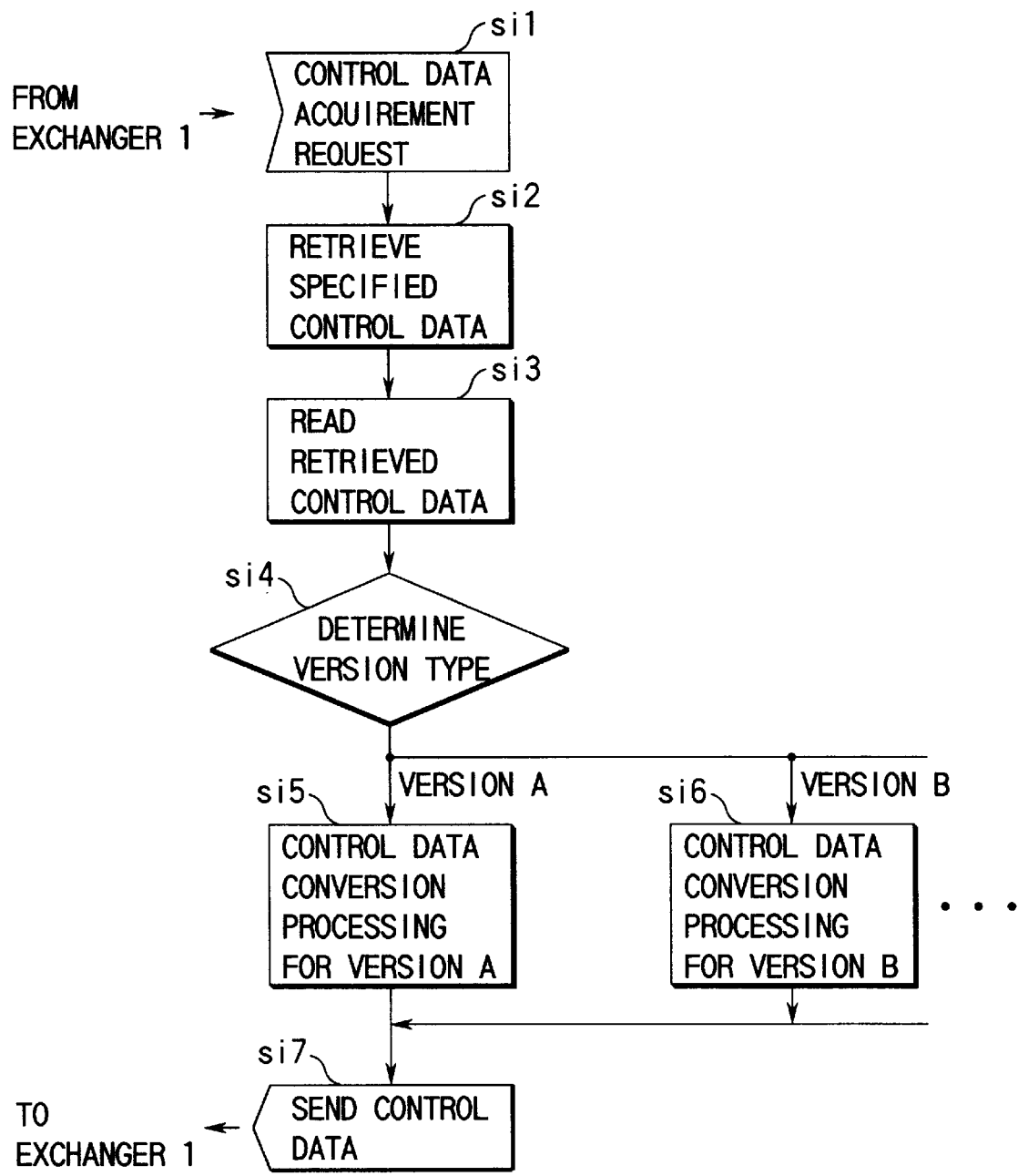
FIG. 22 is a flowchart showing a control procedure of the ninth embodiment according to the present invention.

Next, operation of the exchange system constructed as above will be explained on the basis of a flowchart shown in FIG. 22.

Firstly, upon receipt of a control data acquirement request from the exchanger 1 (step Si1), the CPU 53 retrieves a requested control data item (step Si2), and reads the retrieved control data item (step Si3). In this case, the control data acquirement request is added with data for identifying the version of an exchange program used in the exchange controller 923.

The CPU 53 determines the version type of the exchange program used in the exchange controller 923 (step Si4), and carries out conversion processing on the control data item in accordance with the version of the exchange program thus determined (steps Si5 and Si6). The CPU 53 sends the control data item to the exchanger 1 after conversion (step Si7).

Thus, according to the ninth embodiment, every time a control data acquirement request issues, the control data management device 2 converts a requested control data item into a format corresponding to the version of an exchange program set in the control system which issues the request. Therefore, the control data management device 2 needs to maintain only one type of control data, so that the memory capacity needs not be increased more than required. The conversion processing is performed on only a small amount of data of a control data item to be sent, and therefore, the time period required for the conversion processing does not affect provision of exchange services.

Although the ninth embodiment is based on a requisite of the structure of the first embodiment, the seventh embodiment may be based on any of the structures according to second to eighth embodiments.

Tenth Embodiment

In the second to seventh embodiments, a part of control data is stored in the memory 125 of the control system in the control system. However, the memory area for the control data in the memory 125 is limited, so that no empty area for storing newly acquired control data remains after a certain amount of data is stored in the memory.

Therefore, an embodiment in which a newly acquired control data item can be preferentially stored will be explained below.

Figure 23:
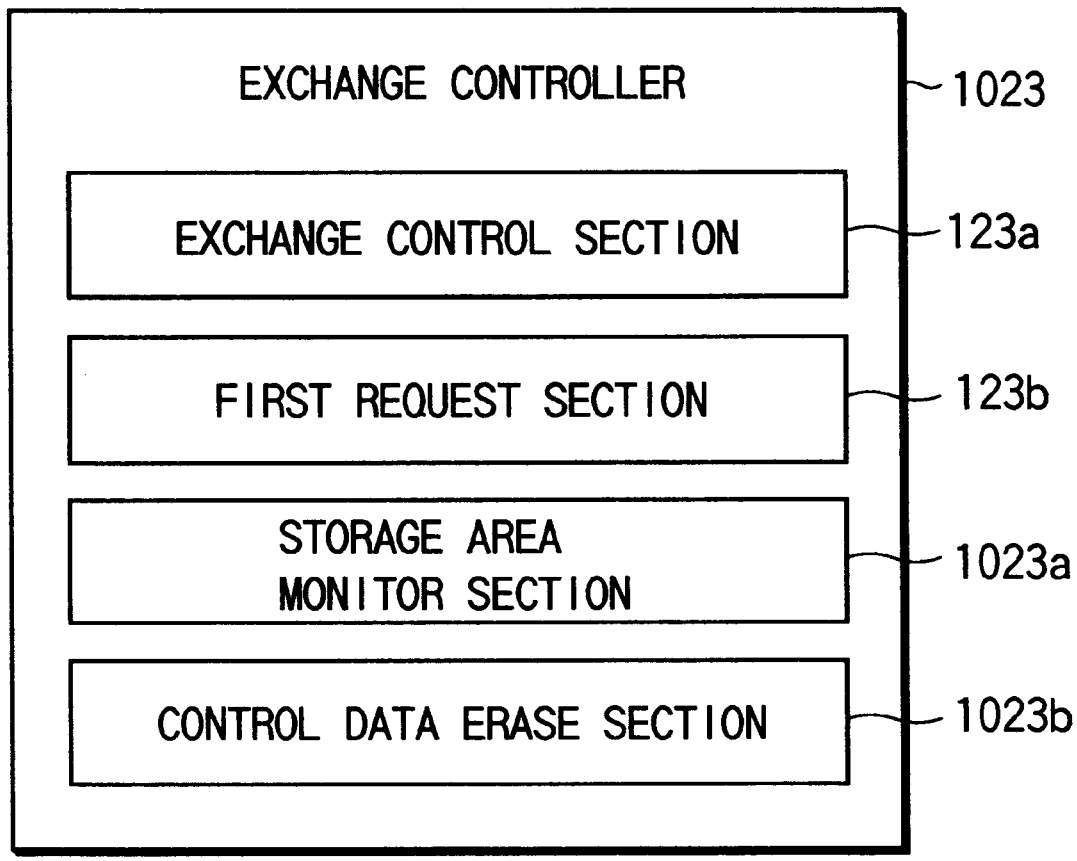
FIG. 23 is a view showing a structure of an exchange controller of a control system of an exchanger according to a tenth embodiment of the present invention.

In the exchange system of the present embodiment, the exchange controller 123 in the exchanger 1 shown in FIG. 1 is replaced with an exchange controller 1023 shown in FIG. 23. Note that the CPU 23 of the control data management device 2 comprises the requested data output section 23a, like in the first embodiment.

The exchange controller 1023 includes, for example, a microcomputer as a main control section, and also includes the exchange control section 123a (which is the same as that in the first embodiment), a first request section 123b (which is the same as that in the first embodiment), a memory area monitor section 1023a, and a control data erase section 1023b, in addition to a known control section generally used in an exchange system. The respective sections are realized in the form of software processing.

The memory area monitor section 1023b monitors the memory area of the memory 125 and determines whether or not an empty area remains for storing a new control data item.

When acquiring a new control data item, the control data erase section 1023b erases the control data item to which the exchange control section 123a referred earliest among the control data items stored in the memory 125 at the present time point, thereby to ensure an empty area in the memory 125, if the memory area monitor section 1023a determines that no empty area remains for storing a new control data item.

Figure 24:
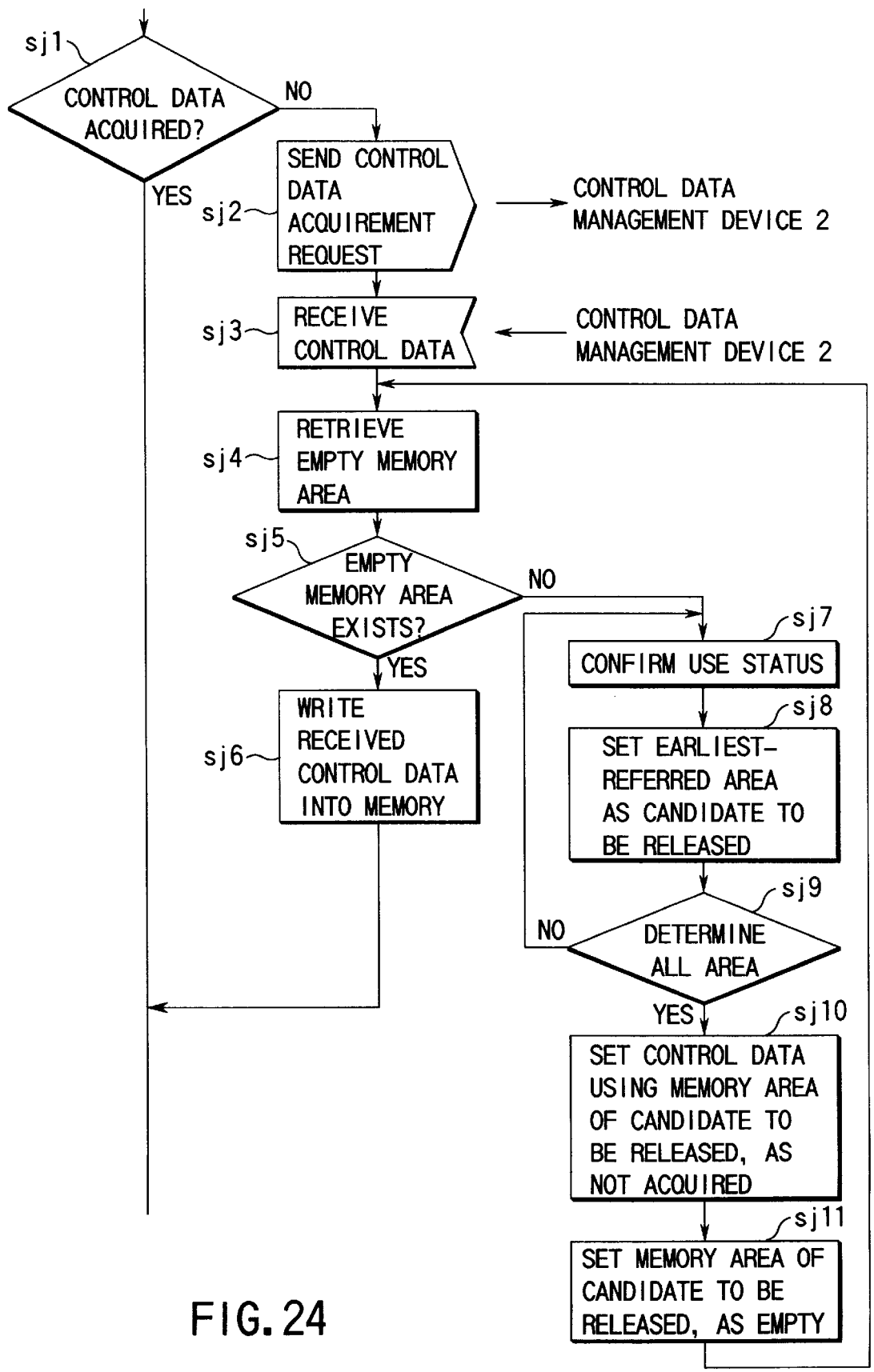
FIG. 24 is a flowchart showing a control procedure of the tenth embodiment according to the present invention.

Next, operation of the system constructed as above will be explained on the basis of a flowchart shown in FIG. 24.

Firstly, upon receipt of an exchange service request, the exchange controller 1023 determines whether or not a target control data item has been acquired, on the basis of the management information shown in FIG. 5 (step Sj1). If it is determined that the target control data item has been acquired (YES), the exchange controller 1023 refers to the control data item stored in the memory 125 and provides an exchange service. In this state, the exchange controller 102 rewrites the last reference time indicated in management information shown in FIG. 25, to a present time. Note that the management information shown in FIG. 25 records a storage address in the memory 125, a storage size, and a last reference time when the exchange control section 123a made the last reference, associated with identification data of a control data item stored in the memory 125 and sub-ID data thereof.

In contrast, if it is determined that the target control data item has not been acquired (NO), the exchange controller 1023 sends an acquirement request for the control data item to the control data management device 2 (step Sj2). The control data management device 2 sends the control data item to the exchanger 1 on the basis of a procedure described in the first embodiment. The exchange controller 1023 receives the control data item sent from the control data management device 2 (step Sj3). Subsequently, the exchange controller 1023 retrieves an empty area in the , A memory 125 (step Sj4), and then, determines presence or absence of an empty area (step Sj5).

If it is determined that an empty area remains (YES), the exchange controller 1023 writes the received control data item into the memory 125 (step Sj6), and continues to provide exchange services. If it is determined that no empty area remains (NO), the exchange controller 1023 refers to the management information shown in FIG. 25, and retrieves the control data item whose reference time is earliest among the control data items stored in the memory 125, i.e., the control data item to which the exchange controller 1023 referred earliest. The exchange controller 1023 sets the memory area corresponding to the retrieved control data item, as a candidate to be released or erased (steps Sj7 to Sj9).

Further, upon completion of the above retrieving, the exchange controller 1023 sets the control data item stored in the area of the candidate to be erased, as being not acquired, in the management information shown in FIG. 5 (step Sj10), and subsequently erases the address representing the memory area of the candidate to be released, from the management information shown in the FIG. 25, to set the memory area as being empty (step Sj11). Thereafter, the exchange controller 1023 goes back again to step Sj4 and retrieves an empty area in the memory 125. The above operation is repeated until it is determined in step Sj5 that an empty area remains.

As has been described above, according to the tenth embodiment, the control data item to which a reference was made earliest is erased to maintain an empty area and a newly acquired control data item is stored into the area, when no empty area remains in the memory area in the memory 125 in the control system. As a result of this, it is possible to prevent a drawback that a newly acquired control data item cannot be stored into the memory 125, and the capacity of the memory in the exchanger 1 can be kept unchanged even when the amount of control data stored in the control data management device 2 is increased in accordance with an increase of exchange services.

In the tenth embodiment, all control data items are targets which can be erased from the memory 125 to maintain an area for storing a newly acquired control data item. However, any predetermined control data item (e.g., basic control data acquired when starting the system as described in the fourth embodiment) may be derived from the targets.

Also, in the tenth embodiment, the control data item to which a reference was made earliest is erased, among control data items stored in the memory 125. However, the control data item which was acquired earliest from the control data management device 2 may be erased. Otherwise, the control data item to which least references were made or to which references were made at the lowest frequency within a predetermined time period may be erased. Further, with use of simplified management information as shown in FIG. 26, it is possible to erase such a control data item which corresponds in size to a control data item to be stored. Alternatively, the condition for selecting the control data item to be erased may be arbitrarily defined.

Eleventh Embodiment

Figure 27:
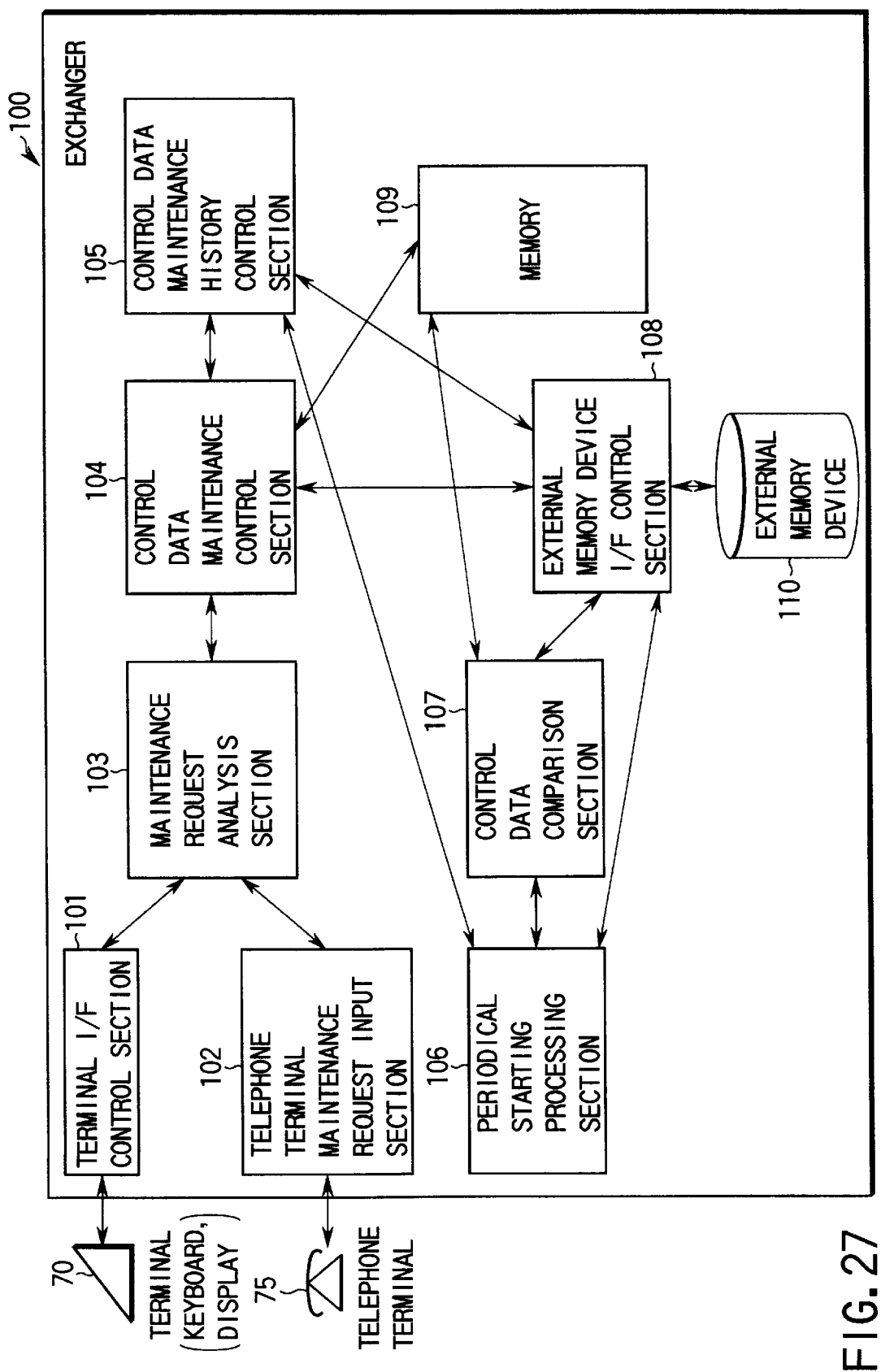
FIG. 27 is a block diagram showing the entire exchanger system according to an eleventh embodiment of the present invention.

In the following, an eleventh embodiment of the exchange system according to the present invention will be explained below. FIG. 27 is a block diagram showing a structure of an exchange system according to the eleventh embodiment. The exchange system comprises an exchanger 100 and a maintenance terminal 70 and/or a telephone terminal 75 connected to the exchanger 100. The maintenance terminal 70 comprises an input device such as a keyboard, a mouse, or the like by which a maintenance man or a system manager carries out maintenance of control data (including not only a change to control data but also new registration and deletion thereof), and a display device such as a display for displaying an operation result concerning control data, and also has a function of communicating with the exchanger 100. The exchanger 100 contains one or more multiplexed control systems (not shown), which provide exchange services, on the basis of a plurality of control data items inputted through the maintenance terminal 70 or the telephone terminal 75. The exchanger 100 manages control data used for exchange services. In order to realize management of the control data, the exchanger 100 comprises a terminal I/F control section 101 for inputting a maintenance request such as a control data change request or the like from the maintenance terminal 70 and for outputting a control data change processing result or the like based on the maintenance request, from the exchanger 100, to the maintenance terminal 70; a telephone terminal maintenance request input control section 102 for inputting a maintenance request from the telephone terminal 75; a maintenance request analysis section 103 for analyzing a maintenance request inputted from the maintenance terminal 70 or the telephone terminal 75 by a maintenance man or a system manager, as to what processing should be performed on which control data item; a control data maintenance control section 104 for performing maintenance such as a change, deletion, or the like on a control data item in a memory 109, on the basis of the maintenance request analyzed by the maintenance request analysis section 103; a control data maintenance history control section 105 for managing a history of maintenance requests inputted by a maintenance man or a system manager; a periodical start processing section 106 for starting processing for storing a control data item in the memory 109, into an external storage device 110, with use of an external storage device I/F control section 108, at a predetermined time interval or a time, or at a predetermined time interval and a specified time set by a maintenance man or a system manager of the exchanger 100; a control data comparison section 107 for comparing control data in the memory 109 with control data in the external storage device 110; an external storage device I/F control section 108 for writing/reading control data with respect to the external storage device 110; the memory 109 for storing control data and programs of the exchanger 100; and the external storage device 110 constituted by a hard disc or the like.

Figure 28:
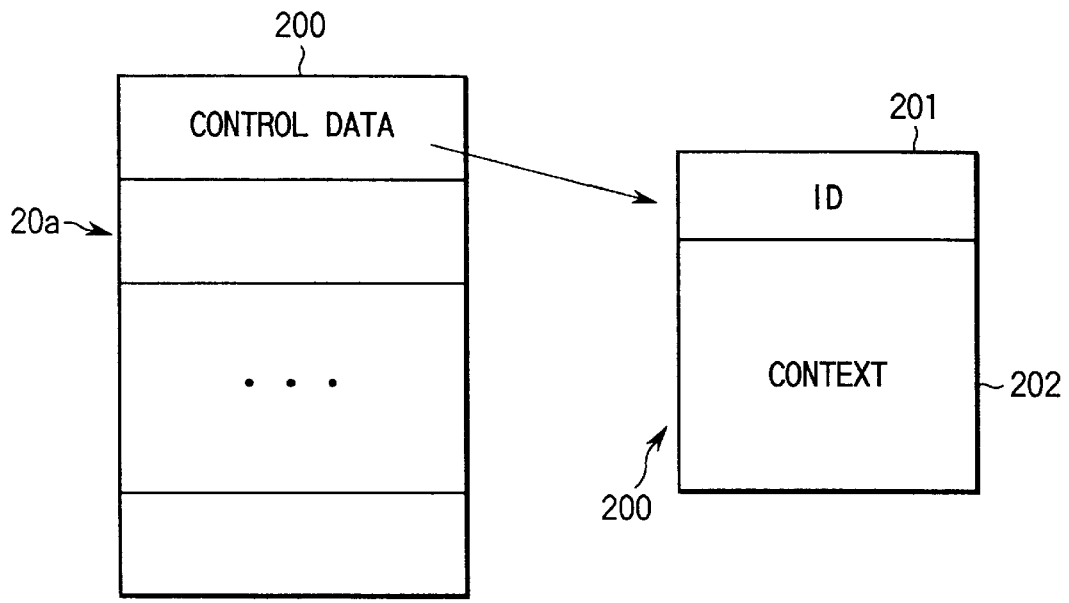
FIG. 28 is a view showing a structure of control data in the eleventh embodiment.

FIG. 28 is a view showing a structure of control data used in the exchanger 100 according to the eleventh embodiment. A control data item 200 includes a control data ID 201 for identifying the control data item 200 itself, and a context 202 corresponding to the control data ID 201. The control data item 200 is stored in a control data storage area 20a on the memory 109 and the external storage device 110, and is used for providing an exchange service for control systems contained in the exchanger 100.

Figure 29:
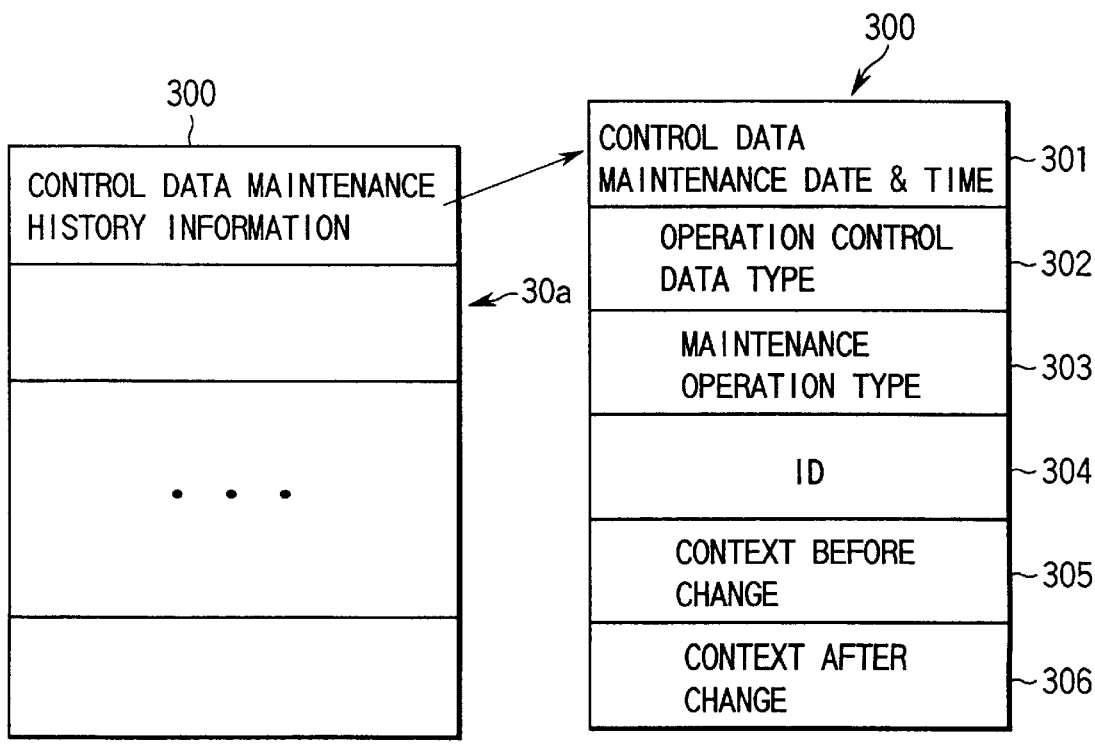
FIG. 29 is a view showing a structure of data change history information in the eleventh embodiment.

FIG. 29 shows a structure of a control data maintenance history information item stored in the exchanger 100 according to the eleventh embodiment. The control data maintenance history information item 300 includes information elements such as control data maintenance data and time 301 indicating when a certain maintenance operation is performed on the control data item 200, a maintenance operation control data type 302 indicting the type on which the operation is performed, a maintenance operation type 303 indicating the type of the maintenance operation performed on the control data item, a control data ID 304 indicating the control data item on which the maintenance operation is performed, a pre-change context 305 before the operation is performed on the control data item, and a post-change context 306 after the operation is performed on the control data item. The control data maintenance history information item 300 is stored and managed in a control data maintenance history information storage area 30a on the memory 109 and the external storage device 110.

Operation of the exchanger 100 described above will be explained below.

(1) A maintenance operation request for the exchanger 100, inputted through the maintenance terminal 70 by a maintenance man or a system manager, is received by the terminal I/F control section 101. The received maintenance operation request is subjected to analysis by the maintenance request analysis section 103, as to which maintenance processing among registration, a change, and deletion should be performed on which control data items 200. Based on the analysis result, the control data maintenance control section 104 records information, with respect to the contents of a maintenance history information item 300, e.g., the maintenance data and time 301 when an operation is performed on the control data item 200, the control data ID 304 of the control data item 200 on which the operation is performed, the maintenance operation type 303 of the operation performed on the control data item 200, and a pre-change context 305 before the operation is performed on the control data item 200, and also performs an operation such registration, a change, or deletion on the control data item 200 in the memory 109.

If the operation on the control data item 200 is completed correctly, the control data maintenance control section 104 records a post-change context 306 after the operation is performed on the control data item 200, with respect to the contents of the control data maintenance history information item 300, and stores the control data maintenance history information item 300 into the control data maintenance history information storage area 30a on the memory 109 and also into the control data maintenance history information storage area 30a on the external storage device 110 with use of the external storage device I/F control section 108.

(2) Next, explanation will be made of a case where the telephone terminal 75 is used to perform a change such as registration, a change, or deletion, on a control data item 200 in the exchanger 100.

When a maintenance man, a system manager, or a user of the exchanger 100 uses the telephone terminal 75 to issue a control data operation request, processing for inputting the control data operation request is carried out from the telephone terminal 75, by means of the telephone terminal maintenance request input control section 102. Like in the case where a maintenance operation request is inputted by the maintenance terminal 70, the maintenance operation request inputted by the telephone terminal maintenance request input control section 102 is subjected to analysis by the maintenance request analysis section 103, as to which maintenance processing among registration, a change, and deletion should be performed on which of control data items 200. Based on the analysis result, the control data maintenance control section 104 records information, with respect to the contents of the maintenance history information item 300, e.g., the maintenance data and time 301 when an operation is performed on the control data item 200, the control data ID 304 of the control data item 200 on which the operation is performed, the maintenance operation type 303 of the operation performed on the control data item 200, and a pre-change context 305 before the operation is performed on the control data item 200, and also performs an operation such registration, a change, or deletion on the control data item 200 in the memory 109. If the operation onto the control data item 200 is completed correctly, the control data maintenance control section 104 records a post-change context 306 after the operation is performed on the control data item 200, with respect to the contents of the control data maintenance history information item 300, and transfers the control data maintenance history information item 300 to the control data maintenance history control section 105. The control data maintenance history control section 105 stores the control data maintenance history information item 300 into the control data maintenance history information storage area 30a on the memory 109 and also into the control data maintenance history information storage area 30a on the external storage device 110 with use of the external storage device I/F control section 108.

(3) Next, explanation will be made of a case where the exchanger 100 starts.

When the exchanger 100 starts, the control data maintenance history control section 105 firstly reads a control data item 200 stored in the external storage device 110, with use of the external storage device I/F control section 108, and also reads a control data maintenance history information item 300 stored in the external storage device 110 with use of the external storage device I/F control section 108 if any maintenance control data maintenance history information item 300 is recorded in the control data maintenance history information storage area 30a in the external storage device 110. From the control data ID 304 of the control data maintenance history information item 300 thus read, the control data maintenance history control section 105 operates the control data history information item 300 with respect to a corresponding control data item 200 on the memory 109, to update the context of the corresponding control data item 200 in the memory 109, to the context of the control data maintenance history information item 300.

(4) Next, explanation will be made of a case where the control data maintenance history information storage area 30a in the external storage device 110 is used up to a predetermined area.

In this case, the control data maintenance history control section 105 uses the external storage device I/F control section 108 to read a control data maintenance history information item 300 stored in the external storage device 110, and updates the corresponding control data item 200 in the memory 109, to the contents of the control data maintenance history information item 300, from the control data ID 304 of the control data maintenance history information item 300 thus read. This operation is performed on all the control data maintenance information items 300 stored in the control data maintenance history information storage area 30a on the external storage device 110. After the update processing is performed on all the control data items corresponding to all the control data maintenance history information items 300 in the external storage device 110, the control data maintenance history control section 105 initializes the control data maintenance history information storage area 30a in the external storage device 110.

(5) Next, explanation will be made of a case where updating of a control data item 200 in the external storage device 110 at a predetermined time interval previously specified is registered.

After a lapse of a predetermined time period, the periodical start processing section 106 starts update processing of a control data item 200 in the external storage device 110, with respect to the control data maintenance history control section 105. The control data maintenance history control section 105 uses the external storage device I/F control section 108 to read a control data maintenance history information item 300 stored in the external storage device 110, and updates a corresponding control data item 200 in the memory 109, to the context of the control data maintenance history information item 300, from control data ID 304 of the control data maintenance history information items 300 thus read. This operation is performed on all the control data maintenance information items 300 stored in the control data maintenance history information storage area 30*a* on the external storage device 110. After the update processing is performed on all the control data items corresponding to all the control data maintenance history information items 300 in the external storage device 110, the control data maintenance history control section 105 initializes the control data maintenance history information storage area 30*a* in the external storage device 110.

(6) Next, explanation will be made of a case where a control data item 200 in the control data storage area 20*a* in the memory 109 is written into the control data storage area 20*a* in the external storage device 110, upon a request from a maintenance man or a system manager or at a predetermined time interval or a predetermined time.

When a control data item 200 in the control data storage area 20*a* in the memory 109 is written into the control data storage area 20*a* in the external storage device 110 upon a request from a maintenance man or a system manager, the control data maintenance control section 104 writes the control data item 200 in the control data storage area 20*a* in the memory 109, into the control data storage area 20*a* in the external storage device 110. After this processing is completed correctly, the control data maintenance control section 104 makes the control data maintenance history control section 105 start initialize processing of the control data maintenance history information items 300 in both the memory 109 and the external storage device 110, and the control data maintenance history control section 105 performs the initialize processing of the control data maintenance history information items 300 in both the memory 109 and the external storage device 110.

When a control data item 200 in the control data storage area 20*a* in the memory 109 is written into the control data storage area 20*a* in the external storage device 110 at predetermined time intervals or a predetermined time, the periodical start processing section 106 writes the control data item 200 in the control data storage area 20*a* in the memory 109, into the control data storage area 20*a* in the external storage device 110. After this processing is completed, the periodical start processing section 106 makes the control data maintenance history control section 105 start initialize processing of the control data maintenance history information items 300 in both the memory 109 and the external storage device 110. The control data maintenance history control section 105 performs the initialize processing of the control data maintenance history information items 300 in both the memory 109 and the external storage device 110.

(7) Next, explanation will be made of a case where a control data item 200 in the control data storage area 20*a* in the memory 109 is compared with a control data item 200 in the control data storage area 20*a* in the external storage device 110, upon a request from a maintenance man or a system manager or at predetermined time intervals or a predetermined time.

When a control data item 200 in the control data storage area 20*a* in the memory 109 is compared with a control data item 200 in the control data storage area 20*a* in the external storage device 110 upon a request from a maintenance man or a system manager, the control data maintenance control section 104 makes the control data comparison section 107 start processing for comparing a control data item 200 in the control data storage area 20*a* in the memory 109 with a control data item 200 in the control data storage area 20*a* in the external storage device 110. Otherwise, when the same comparison as above is performed at predetermined time intervals or a predetermined time, the periodical start processing section 106 makes the control data comparison section 107 start the same processing as above. The control data comparison section 107, started thus by the control data maintenance control section 104 or the periodical start processing section 106, uses the external storage device I/F control section 108 to read the control data item 200 in the external storage device 110, and compares the item with a control data item 200 in the memory 109, which has the same control data ID 201 as that of the control data item 200 read.

If the contexts of both the control data items thus compared are equal to each other, a next control data item 200 in the external storage device 110 is read and compared with a corresponding control data item 200 in the memory 109. Otherwise, if the contexts of both the control data items are different from each other, a confirmation is made as to whether an operation has been made to the control data item 200 having the control data ID 201 whose contexts are different from each other, with respect to the corresponding data maintenance history information item 300 in the memory 109 and the external storage device 110. If an operation has been made, the post-change context 306 of the control data maintenance history information item 300 is compared with the context of the data of the control data item 200 in the memory 109. If both the contexts are then equal to each other, it is determined that correct processing has been made, and a next control data item 200 in the external storage device 110 is read and compared with a corresponding control data item 200 on the memory 109. Otherwise, if both the contexts are then different from each other, it is determined that the context has not been changed by a correct operation, and the control data item 200 in the memory 109 is operated with use of the control data item 200 in the external storage device 110.

As has been explained above, according to the eleventh embodiment, when a maintenance operation such as registration, a change, or deletion of a control data item is carried out, a control data maintenance history information item is generated from the ID of an operated control data item and a changed context thereof, and the control data maintenance history information item is stored in a memory or an external storage device. Therefore, maintenance history information can be complied with respect to not only a change to a control data item in accordance with a command inputted by a maintenance man or the like, but also a control data item set through a telephone terminal. Besides, even when the system is comprised of a plurality of multiplexed control systems, an operation such as registration, a change, or deletion can be carried out with respect to data common to all or part of the control systems.

In addition, since there are provided a means for changing a control data item stored in an external storage device on the basis of a control data maintenance history information item as described above, at a predetermined time or in response to a request form a maintenance man, and a means for erasing a control data maintenance history information item as described above, it is possible to avoid a situation that a control data item registered, changed or deleted is not stored in the external storage device before storing is completed after starting storing a control data item in the memory into the external storage device at a time point requested by a system manager, and limited areas for storing commands in the memory in the control system and in the external storage device can be used efficiently to perform maintenance management of a new control data item.

In addition, control data items in the memory and in the external storage device are compared with each other at a predetermined time interval or upon a request from a maintenance man or a system manager, and a reference is made to control data maintenance history information items recorded in the memory and in the external storage device if the contexts of both the control data items in the external storage device and in the memory. If a corresponding control data maintenance information item is not stored in the control data maintenance history, the control data item in the memory is updated by the control data item in the external storage device. Therefore, control data broken by hardware malfunctions and software bugs can be recovered, so that the reliability of the control systems can be improved.

Twelfth Embodiment

In the following, explanation will be made of a twelfth embodiment of the exchange system provided with a management device to perform management of operation, according to the present invention.

Figure 30:
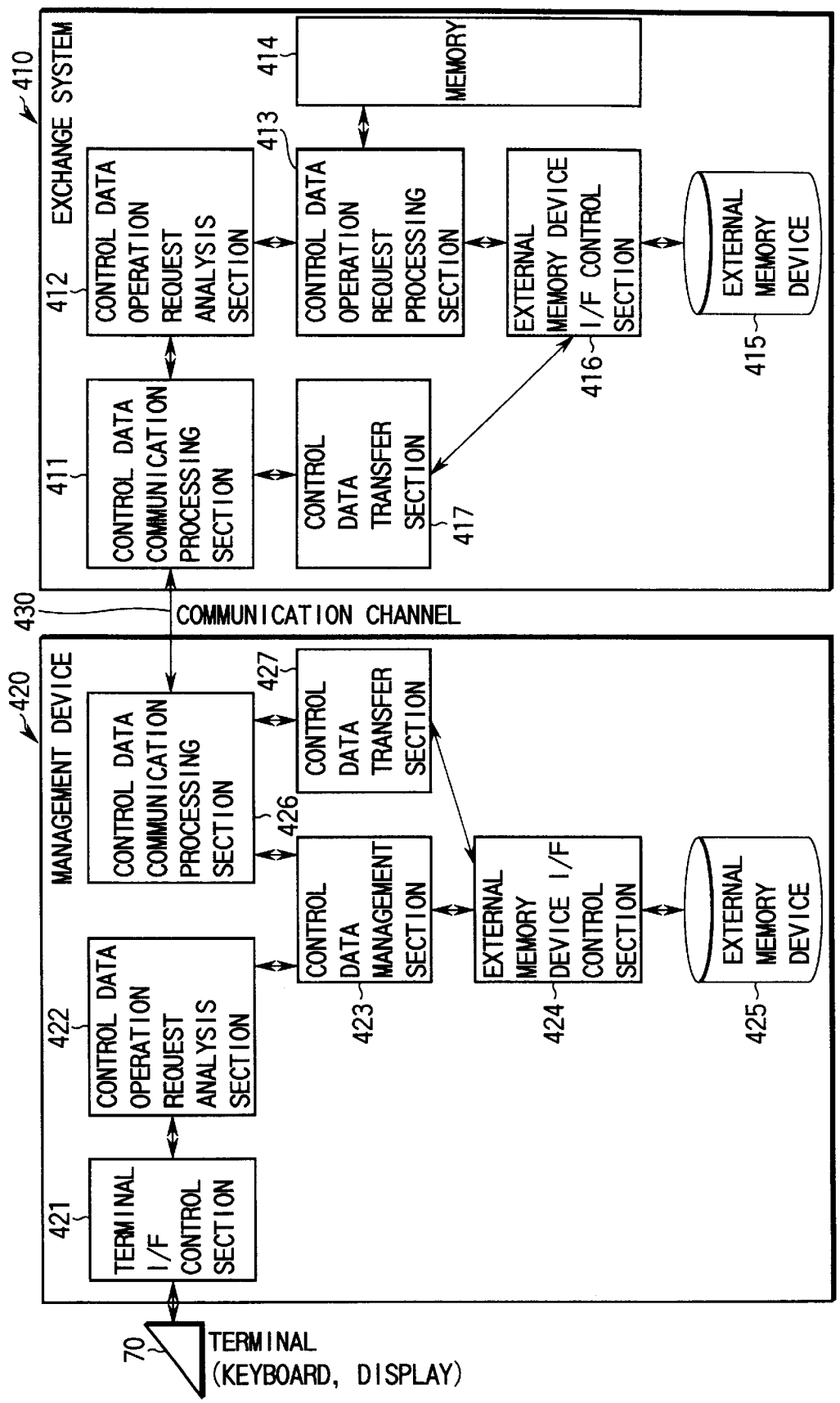
FIG. 30 is a block diagram showing the entire exchanger system treated in a twelfth embodiment of the present invention.

FIG. 30 is a block diagram showing a structure of an exchange system according to the twelfth embodiment. The exchange system comprises one or multiplexed control systems (not shown), and an exchanger 410 which provides exchange services in this control system is connected to a management device 420 through a communication path 430, so that control data and operation requests can be transferred between the exchanger 410 and the management device 420 through the communication path 430.

The exchanger 410 comprises a control data communication processing section 411 for internally receives a control data operation request transferred through the communication path 430 and for transferring a control data operation result obtained in itself to the management device 420; a control data operation request analysis section 412 for analyzing an inputted control data operation request as to what processing should be performed on which control data item; a control data operation request processing section 413 for performing an operation on a control data item in a memory 414, in accordance with an operation of the analyzed control data operation processing request; the memory 414 for storing control data items; an external storage device 415 for storing control data items; an external storage device I/F control section 416 for writing/reading control data with respect to the external storage device 415; and a control data transfer section 417 for transferring a control data item subjected to an operation, to the management device 420.

The management device 420 is connected with a maintenance terminal 70 comprising an input device such as a keyboard or the like by which a maintenance man or a system manager inputs a control data operation request or the like to the exchanger 410, and a display device such as a display for displaying an operation result based on the operation request. Inside the management device, there are provided a terminal I/F control section 421 for inputting, into itself, a control data operation request from the maintenance terminal or for outputting a control data operation result transferred from the exchanger 410, to the maintenance terminal 70; a control data operation request analysis section 422 for analyzing an inputted control data operation request as to what processing should be performed on which control data item; a control data operation management section 423 for performing operation management of a control data item, in accordance with the analyzed control data operation management request; an external storage device I/F control section 424 for writing/reading control data with respect to an external storage device 425; the external storage device 425 for storing control data items; a control data communication processing section 426 for transferring a control data item through the communication path 430 to the exchanger 410 or for inputting a control data operation result from the exchanger 410, through the communication path 430 to the device 420 itself; and a control data transfer section 427 for controlling transfer of a control data item in the external storage device 425, to the exchanger 410.

Schematic operation of the exchange system will be as follows. A control data operation request inputted from the maintenance terminal 70 by a system manager or a maintenance man, for registration, a change, deletion, or the like of a control data item, is taken into the management device 420 by the terminal I/F control section 421. Subsequently, in the management device 420, the control data operation request analysis section 422 carries out analysis as to what operation should be performed on a control data item, on the basis of the control data operation request. Subsequently, the control data management control section 423 performs processing corresponding to the analyzed control data operation request, in accordance with the control data operation request. If a control data operation is required with respect to the exchanger 410, the control data communication processing section 426 of the management device 420 performs processing for sending an operation request for registration, a change, or deletion or the like of a control data item, to the control data communication processing section 411 of the exchanger 410, and for receiving a control data operation result by the exchanger 410, from the control data communication processing section 411 of the exchanger 410, through the communication path 430.

Also, the exchanger 410 transfers a control data operation request sent from the management device 420 through the communication path 430, to the control data operation request analysis section 412 through the control data communication processing section 411. The control data operation request analysis section 412 carries out analysis as to what operation should be performed on which control data item, on the basis of the control data operation request. Subsequently, the control data operation request processing control section 413 performs operation such as registration, a change, deletion, or the like on a control data item in the memory 414, on the basis of the analysis result. The control data item changed by this operation is stored into the external storage device 415 upon a request from a system manager or a maintenance man or at a previously specified time interval or time, with use of the external storage device I/F control section 416.

Next, explanation will be made of operation in a case where a large amount of control data is registered, change, or deleted, in association with start of operation of a new exchanger 410, update of the version of software, or an increase, a reduction, or a movement of telephone terminals contained in the exchanger 410. In this case, a system manager or a maintenance man uses the maintenance terminal 70 to input a control data operation request inputted for registration, a change, deletion, or the like of a control data item. The control data operation request inputted from the maintenance terminal 70 is inputted into the management device 420 by the terminal I/F control section 421 in the management device 420. Subsequently, in the management device 420, the control data operation request analysis section 422 carries out analysis as to what operation should be performed on which control data item, with respect to the control data operation request. Based on the operation contents of the analyzed control data operation request, the control data management control section 423 performs operation such as registration, a change, deletion, or the like, on the control data item in the management device 420, and uses the external storage device I/F control section 424 to store the control data item thus operated, into the external storage device 425. This operation is performed on all control data items necessary for the exchanger 410 to provide exchange services, and all the control data items are stored as data files in the control data storage area in the external storage device 425.

After the above operation is carried out for all the control data items, the control data management control section 423 uses the control data transfer section 427, the control data communication processing section 426, and the communication path 430, to transfer the control data files stored in the external storage device 425, to the exchanger 410. In the exchanger 410, the control data communication processing section 411 sends control data items in the control data files sent through the communication path 430, to the control data transfer section 417. The control data transfer section 417 uses the external storage device I/F control section 416, to store the received control data items into the external storage device 415. The above transfer processing is carried out to the end of the control data files stored in the external storage device 425 in the management device 420.

Further, in the exchange system according to the present embodiment, and particularly, in the exchanger 410, control data items stored in the external storage device 415 are read with use of the external storage device I/F control section 416 when starting the system, and the control data items stored in the memory 414 are rewritten with the control data items thus read, with use of the control data operation request processing control section 413.

Figure 31:
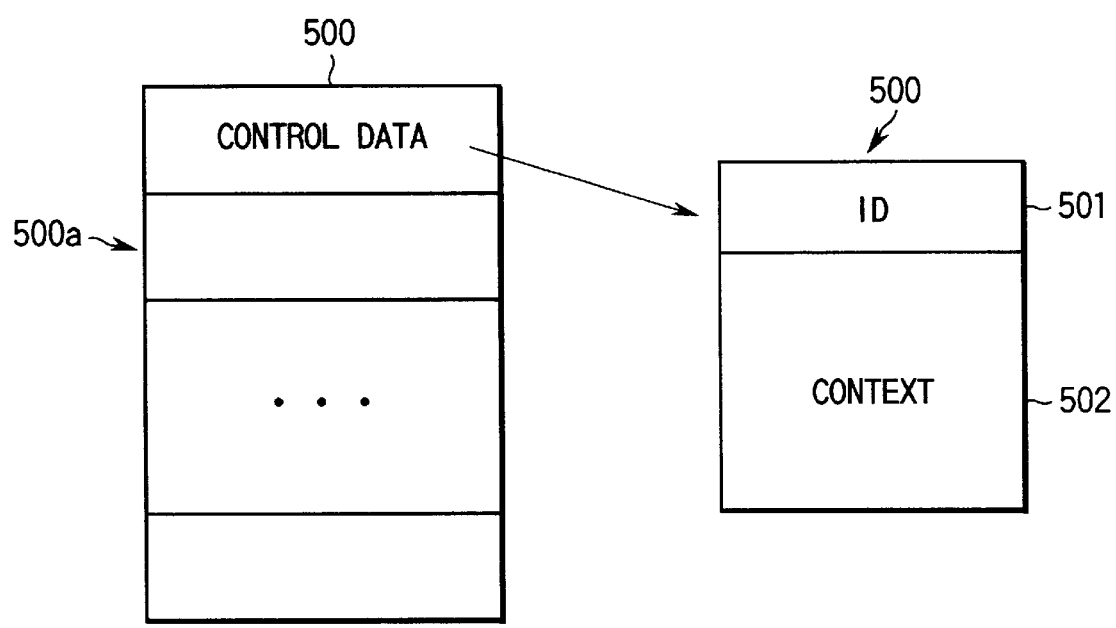
FIG. 31 is a view showing a structure of control data in the twelfth embodiment.

FIG. 31 is a view showing an example of a structure of control data used in the exchanger 410 according to the present embodiment. A plurality of control data items 500 required for providing exchange services are stored in the control data storage area 50*a* of the memory 414 or the external storage device 415. Each of the control data items 500 stored in the control data storage are 50*a* includes a control data ID 501 for identifying the type of the control data item itself, and a context 502 which is an actual context of the control data item 500.

When control data files generated on the basis of control data items 500 in the management device 420 are written into the external storage device 415 in the exchanger 410 and the exchanger 410 is started, the control data items in the control data files are read from the external storage device 415 to change the control data items in the memory 414. In this manner, it is possible to shorten an operation processing time, when a control data operation such as registration, a change, or deletion is performed on a large amount of control data items 500, in association with a system change.

Meanwhile, in case where the CPU used in the exchanger 410 is of a type different from that used in the management device 420, the order or length of bytes forming a control data ID or a control data item may differ between both types of CPUs. The exchange system according to the twelfth embodiment shown in FIG. 30 responds to this case by using control data files 600 having a structure shown in FIG. 32. A plurality of control data files 600 are stored in the control data file storage area 60*a* in each of the external storage devices 415 and 425, and each of the control data files 600 includes a control data ID 601 of a corresponding control data item, and an actual data context 602 of the control data item. For each of the control data ID 601 and the control data context 602, information representing a data structure is recorded. Specifically, the control data ID 601 is added with information representing the order 601*a* of bytes forming the data of the control data ID, the type 601*b* of the data ID, the length 601*c* of the data ID, and the value 601*d* of the data ID. Likewise, the control data context 602 is added with information representing, the order 602*a* of bytes forming the data, the type 602*b* of the data corresponding to the control data ID 601, the length of the data corresponding to the control data ID 601, and the value of the data corresponding to the control data ID 601. In case where the order of bytes forming data is predetermined, the order of bytes forming data is not recorded.

Figure 32:
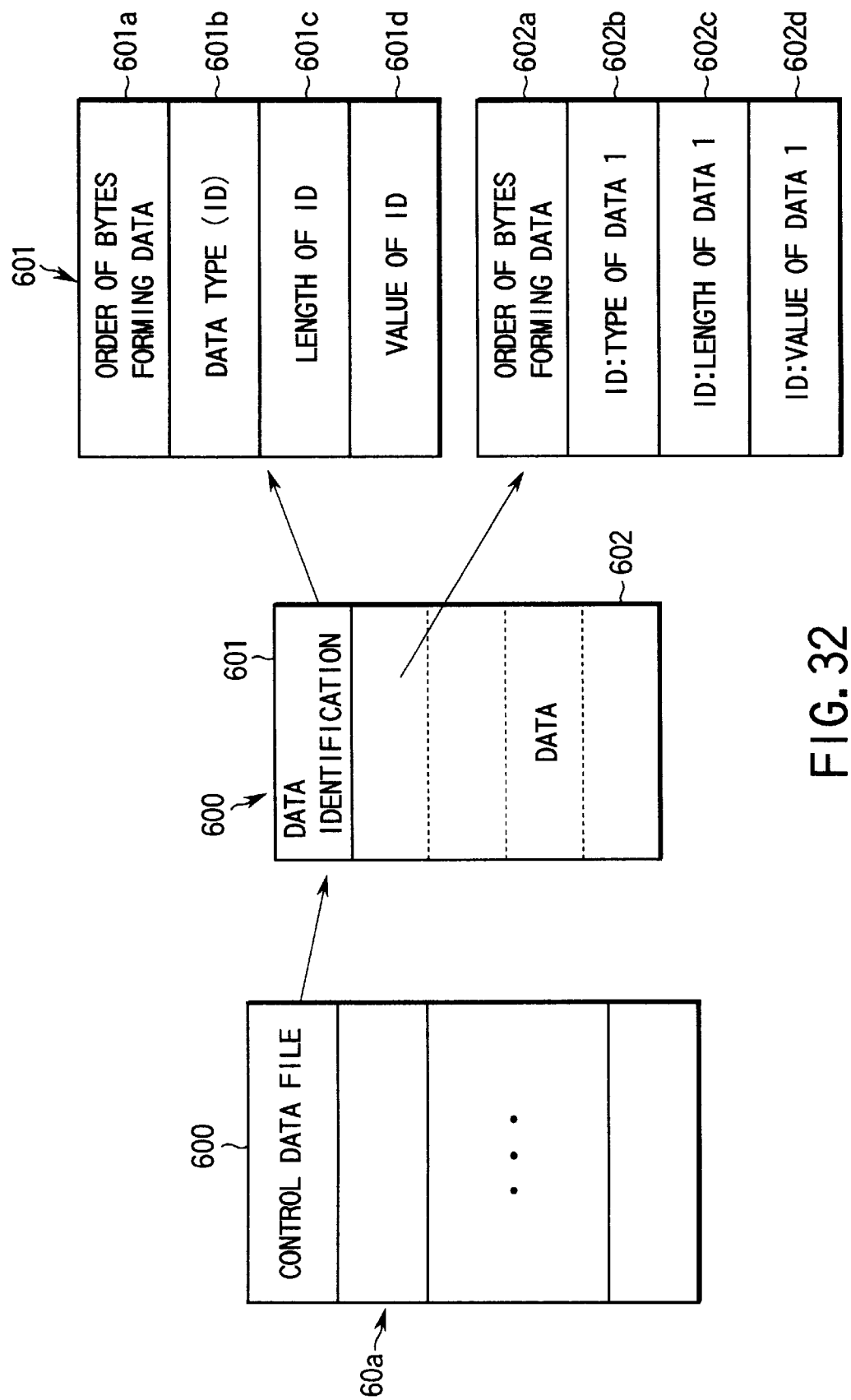
FIG. 32 is a view showing a structure of data change history information in the twelfth embodiment.
Figure 33:
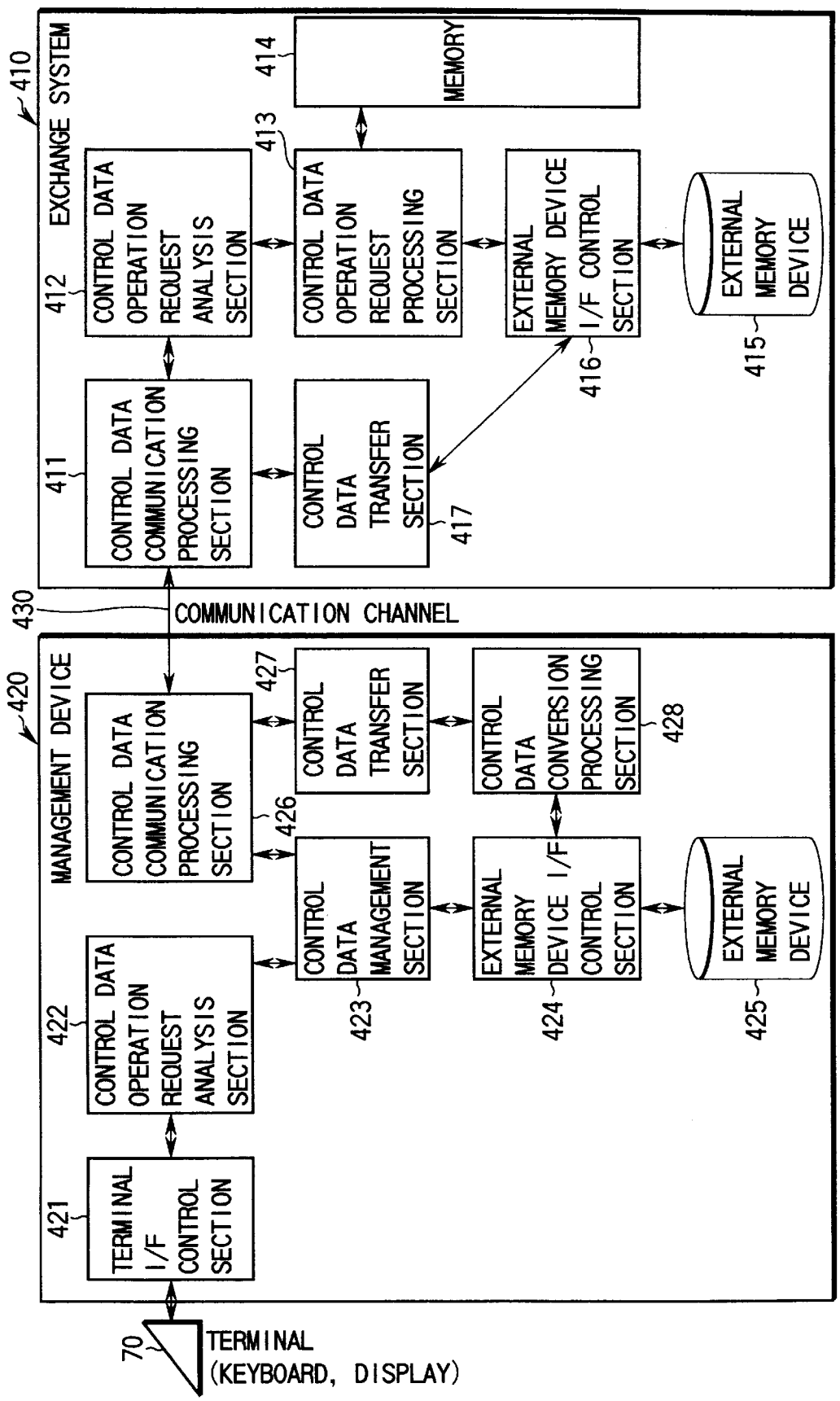
FIG. 33 is a block diagram showing the entire exchanger system of a thirteenth embodiment according to the present invention.

Next, explanation will be made to data operation in a case where the control data files 600 described above are used. In this case, when the management device 420 uses the control data management control section 423 to generate a control data file, a control data file 600 having a structure as shown in FIG. 32 is generated in correspondence with a control data ID and a control data item to be generated, and is stored into the external storage device 425. Next, the control data file 600 stored in the external storage device 425 is transferred to the exchanger 410 through the control data transfer section 427, the control data communication processing section 426, and the communication path 430. In the exchanger 410, the control data communication processing section 411 transfers the control data film 600 transferred from the management device 420 to the control data transfer section 417. The control data transfer section 417 uses the external storage device I/F control section 416, to store the control data file 600 transferred from the control data communication processing section 411, into the external storage device 415. Thereafter, the exchanger 410 reads control data files 600 stored in the external storage device with use of the external storage device I/F control section 416 when the system starts. Further, the control data operation request processing control section 413 reads data in the order of bytes forming data (or the data context 602), recorded in the control data file 600, and converts data whose data type and data length are recorded in the control data file 600, into data having a format which can the exchanger 410 read. The control data operation request processing control section 416 then writes the converted data into the control data file storage area 60*a* in the memory 414.

As has been explained above, in the twelfth embodiment, the management device 420 adds information of at least the type of data, the length of data, the order of bytes forming data, to each of a control data ID 601 and a control data context 602 of a control data file 600, and records the order of bytes of each data item in the order defined by the order of bytes forming data. In this manner, the management device 420 generates a control data file and transfers the control data file, to the exchanger 410. On the other side, the exchanger 410 reads the control data ID and data corresponding to the control data ID, in accordance with the type of data, the length of data, and the order of bytes forming data, recorded in the control data file, from the control data file transferred from the management device 420, and uses the data thereof to change an existing control data item. Therefore, it is possible to realize a function of converting a control data item inputted to the management device 420, into a control data file of a format which can be dealt by the exchanger 410, and therefore, it is less necessary to generate control data files in compliance with every of the type of the exchanger 410, the model thereof, the type of the CPU used therein, and the version of the exchange program also used therein.

As has been explained above, according to the twelfth embodiment, for every control data item inputted from an external input device, the management device generates a control data file constituted by an ID of the control data item and a data context corresponding to the control data ID, and transfers the control data file to the main section of the system to store the file into the external storage device. Control data items are read when the main section of the system is started, and the control data items existing in the main section of the system are changed by the control data items thus read. Therefore, in a case of registering, changing, or deleting a large amount of control data items when starting a new control system, when updating the version of software, when reconstructing control data items because of malfunctions, or when increasing, reducing, or moving telephone terminals contained in a control system, it is possible to shorten the processing time required for changing the control data items, so that the time period for which exchange services are stopped is shortened, contributing to an improvement of the reliability of the system.

In addition, the management device adds information of at least the type of data, the length of data, the order of bytes forming data, to each of a control data ID and a control data context 602 of a control data file, and records the order of bytes of each data item in the order defined by the order of bytes forming data. In this manner, the management device generates a control data file and transfers the control data file, to the main section of the system. On the other side, the main section of the system reads the control data ID and data corresponding to the control data ID, in accordance with the type of data, the length of data, and the order of bytes forming data, recorded in the control data file, from the control data file transferred from the management device, and uses the data thereof to change an existing control data item. Therefore, it is possible to realize a function of converting a control data item inputted to the management device, into a control data file of a format which can be dealt by the main section of the system, and therefore, it is less necessary to generate control data files in compliance with every of the type of the main section of the system, the model thereof, the type of the CPU used therein, and the version of the exchange program also used therein.

Further, there is provided a means for obtaining function property information representing functions of the main section of the system (e.g., the type thereof, the model thereof, the type of the CPU used therein, and the version of the exchange program also used therein) form the main section of the system or a means for obtaining the function property information from an external input device. A control data file generated by the management device is converted into a format which can be dealt with by the main section of the system, based on the function property information, and is then transferred. Therefore, it is less necessary to generate control data files in compliance with every of the type of the main section of the system, the model thereof, the type of the CPU used therein, and the version of the exchange program also used therein.

Thirteenth Embodiment

The twelfth embodiment is an example of a case in which an exchanger 410 is arranged to be capable of reading a control data file 600 having a structure as shown in FIG. 32. However, in a case where the exchanger 410 does not have a function of reading each items of information of the control data file 600, the following measure will be considered.

FIG. 30 is a block diagram showing a structure of a thirteenth embodiment according to the twelfth embodiment, in which an exchange processing section 428 is added in the management device 420. Note that the other functional circuit sections than the section 428 in the management device 420 are constructed to be the same as those in the management device 420 shown in FIG. 30.

In the present control system in which the exchanger 410 does not have a function of reading each items of information of the control data file 600 shown in FIG. 32, a system manager or a maintenance man previously inputs the function property information concerning the exchanger 410, such as the type thereof, the model thereof, the type of the CPU used therein, the exchange program also used therein, and the like, into the management device 420, with use of the maintenance terminal 70. In the management device 420, the control data management control section 423 generates a control data file 600, and uses the external storage device I/F control section 424 to store the generated control data file 600 into the external storage device 425. Subsequently, the control data conversion processing section 428 converts the control data file 600 into a control data file 600' having bytes arranged in the order of forming data in compliance with the exchanger 410 and having a data length in compliance with the exchanger 410, on the basis of the inputted function property information concerning the type, the mode, the CPU type, and the exchange program of the exchanger 410. The converted control data file 600' is transferred to the exchanger 410 with use of the control data transfer section 427, the control data communication processing section 426, and the communication path 430.

Meanwhile, in the exchanger 410, the control data communication processing section 411 transfers the control data film 600' transferred from the management device 420 to the control data transfer section 417. The control data transfer section 417 uses the external storage device I/F control section 416, to store the control data file 600' into the external storage device 415. Thereafter, the exchanger 410 reads control data files 600' stored in the external storage device with use of the external storage device I/F control section 416 when the system starts. Further, the control data operation request processing control section 413 analyzes control data items recorded in the control data files 600' and writes them into the control data items in the memory 414.

Note that control data files 600 prepared by the management device 420 need not always be converted, one after another, into control data files 600' which can be dealt with by the exchanger 410, by the control data conversion processing section 428, but the files 600 may be converted at once in a batch processing and then send to the exchanger 410. In this case, a system manager or a maintenance man previously inputs the function property information concerning the exchanger 410, such as the type thereof, the model thereof, the type of the CPU used therein, the exchange program also used therein, and the like, with use of the maintenance terminal 70. Thereafter, in the management device 420, the control data management control section 423 generates a control data file 600, and uses the external storage device I/F control section 424 to store the generated control data file 600 into the external storage device 425.

Subsequently, the control data conversion processing section 428 converts control data files 600 into control data files 600' each having bytes arranged in the order of forming data in compliance with the exchanger 410 and having a data length in compliance with the exchanger 410, on the basis of the inputted function property information (concerning the type, the mode, the CPU type, the exchange program of the exchanger 410, and the like). The converted control data files 600' are transferred to the exchanger 410 with use of the control data transfer section 427, the control data communication processing section 426, and the communication path 430.

Meanwhile, in the exchanger 410, the control data communication processing section 411 transfers the control data files 600' transferred from the management device 420 to the control data transfer section 417. The control data transfer section 417 uses the external storage device I/F control section 416, to store the control data files 600' into the external storage device 415. Thereafter, the exchanger 410 reads control data files 600' stored in the external storage device with use of the external storage device I/F control section 416 when the system starts. Further, the control data operation request processing control section 413 analyzes control data items recorded in the control data files 600' and writes them into the control data items in the memory 414.

The present exchange system has been explained with respect to a case in which a system manager or a maintenance man previously inputs the function property information concerning the exchanger 410, such as the type thereof, the model thereof, the type of the CPU used therein, the exchange program also used therein, and the like, into the management device 420, with use of the maintenance terminal 70. However, the same function and effect can be expected if the structure of the system is arranged such that the management device is added with a function of taking in the function property information concerning the exchanger 410 through the communication path 430.

As has been described above, according to the present invention, the following functions and advantages are obtained.

(1) A first exchange system according to the present invention comprises a main exchanger including a plurality of interface sections each containing one of an extension terminal, an office line, and a private line, e.g., a line circuit, a trunk circuit, and a maintenance terminal I/F device, and a plurality of control systems, and a control data management device connected to the main exchanger. The control data management device is provided with a data storage section, e.g., a memory or the like, for storing a number of control data items. Each of the plurality of control systems is provided with an exchange section such as an exchange switch or the like for arbitrarily exchanging connections of the interface sections, and a first request section for requesting a control data item necessary for an exchange service to be provided, from the control data management device. The control data management device is provided with a requested data output section for reading the control data item requested by the first request section and for outputting the control data item to the main exchanger, and an exchange control section for controlling each of the exchange section and the plurality of interface sections, based on the control data item outputted from the requested data output section, where any of the control systems is defined as an active system.

Therefore, in a control system defined as an active system, a control data item necessary for providing an exchange service is acquired from the control data management device, every time when a necessity for providing an exchange service issues. Therefore, the control system needs not previously store all control data items.

(2) In a second exchange system according to the present invention, each of the plurality of control systems described in the first exchange system includes a control data storage section such as a memory or the like for storing the control data item outputted by the requested data output section. From the control data management device, each of the first request sections requests a control data item which is not stored in the control data storage section among control data items necessary for an exchange service to be performed by a control system whose first request section is requesting. Each of the exchange control sections controls the exchange section and the plurality of interface sections, based on the control data item outputted from the requested data output section and the control data items stored in the control data storage section, where any of the control systems is defined as an active system.

Therefore, the control systems can avoid labor for acquiring again a control data item once acquired, contributing to an improvement of the throughputs of the control systems.

(3) In a third exchange system according to the present invention, each of the first request sections in the second exchange system requests, from the control data management device, a predetermined control data item among the number of control data items, when any of the control system is started, where the control system started is defined as an active system.

Therefore, the control system defined as an active system is capable of previously taking in a basic control data item when a memory is reset, e.g., when restarting the system. Accordingly, it is possible to lower a reduction in the response speed in response to an exchange service request.

(4) In a fourth exchange system according to the present invention, each of the first request sections described in the third exchange system requests, from the control data management device, a predetermined control data item among the number of control data items, when any of the control systems is started, where the control system started is defined as a standby system.

Therefore, it is possible to reduce a time lag until a control system starts after the control system is switched to an active system from a stand-by system. As a result of this, it is possible to construct an exchange system which starts fast when switching control systems.

(5) In a fifth exchange system according to the present invention, each of the plurality of control systems described in the first to fourth exchange system is provided with a data rewrite command receiving section for receiving a control data change request supplied though the plurality of interface sections, and for instructing the control data management device of a control data item to be changed and a content of a change, in accordance with the change request, and the control data management device includes a first control data rewrite section for changing a control data item stored in the control data storage section, in accordance with an instruction by the data rewrite command receiving section.

Therefore, a control data item stored in the control data management device can be changed, in accordance with change processing on a control data item, such as abbreviation dial data obtained from a telephone terminal or the like connected to an interface section.

(6) In a sixth exchange system according to the present invention, each of the plurality of control systems described in the second to fourth exchanger systems is provided with a data rewrite command receiving section for receiving a control data change request supplied though the plurality of interface sections, and for instructing the control data management device of a control data item to be changed and a content of a change, in accordance with the change request. The control data management device is provided with a first control data rewrite section for changing a control data item stored in the control data storage section, in accordance with an instruction by the data rewrite command receiving section, and a first notification section for notifying the main exchanger of a correct completion of the change of the control data item. Each of the plurality of control systems includes a first control data rewrite section for rewriting a corresponding control data item in the control data storage section in accordance with a notification from the first notification section.

Therefore, a control data item stored in the control data management device can be changed, in accordance with change processing on a control data item, such as abbreviation dial data obtained from a telephone terminal or the like connected to an interface section, and a control data item stored in the control systems can be rewritten. It is therefore possible to prevent control data items stored in the control data management device and a control system from differing from each other.

(7) In a seventh exchange system according to the present invention, the control data management device described in the first to sixth exchange systems includes a second control data rewrite section for receiving a predetermined control data change request and for changing a control data item stored in the control data storage section, in accordance with the control data change request.

Therefore, a change operation for changing a control data item stored in the control data management device can be directly made by the control data management device.

(8) In an eighth exchange system according to the present invention, the control data management device described in the second to sixth exchange system is provided with a second control data rewrite section for receiving a predetermined control data change request and for changing a control data item stored in the control data storage section, in accordance with the control data change request, and a second notification section for notifying the main exchanger of a correct completion of the change of the control data item by the second control data rewrite section. Each of the plurality of control systems includes a second control data rewrite section for rewriting a corresponding control data item in the control data storage section in accordance with a notification from the second notification section.

Therefore, a change operation for changing a control data item stored in the control data management device can be directly made by the control data management device, and a control data item stored in the control systems can be rewritten. It is therefore possible to prevent control data items stored in the control data management device and a control system from differing from each other.

(9) In a ninth exchange system according to the present invention, each of the plurality of control systems described in the second to eighth exchange systems includes an acquirement status determining section for determining whether or not a control data requested by the first request section is acquired correctly, where any of the control systems is defined as an active system, a second request section for requesting a control system defined as a stand-by system to send a corresponding control data item if the acquirement status determining section determines that a control data item has not been correctly outputted to the main exchanger, where a control system is defined as an active system, and a requested data transfer section for transferring a corresponding control data item to a control system requesting, if a control data item corresponding to a request from the second request section is stored in the control data storage section. If a control data item is transferred by the requested data transfer section, the exchange control section continues to control the exchange section and the plurality of interface sections in accordance with the control data item. If no control data item is transferred by the requested data transfer section, the exchange control section stops controlling the exchange section and the plurality of interface sections.

Therefore, where a control data item cannot be acquired from the control data management device from the main exchanger system, the control data item can be acquired from a control system defined as a stand-by system if a corresponding control data item is stored in the control system defined as the stand-by system. Accordingly, it is possible to continue to provide an exchange service, based on the control data item.

(10) In a tenth exchange system according to the present invention, each of the plurality of control systems described in the second to ninth embodiments includes an external storage section for storing a control data item outputted from the requested data output section, at a predetermined timing, an acquirement status determining section for determining whether or not a control data requested by the first request section has been acquired correctly, where any of the control systems is defined as an active system, and a control data retrieve section for retrieving a corresponding control data item from control data items stored in the external storage device and for reading the corresponding control data item, if the acquirement status determining section determines that a control data item has not been correctly outputted to the main exchanger. The exchange control section is arranged such that, if the corresponding control data item is read by the control data retrieve section, the exchange control section continues to control the exchange section and the plurality of interface sections in accordance with the control data item, and if no control data item is read by the control data retrieve section, the exchange control section stops controlling the exchange section and the plurality of interface sections.

Therefore, where a control data item cannot be acquired from the control data management device from the main exchanger system, the control data item can be acquired from an external storage section in a control system defined as an active system if a corresponding control data item is stored in the external storage device in the control system defined as the stand-by system. Accordingly, it is possible to continue to provide an exchange service, based on the control data item.

(11) In an eleventh exchange system according to the present invention, the exchange control section of each of the plurality of control systems described in the first to tenth exchange systems has an exchange program for controlling the exchange section and the plurality of interface sections, such that the exchange program can be updated. Each of the plurality of control systems is provided with a program version notification section for notifying the control data management section, of the type of the exchange program of the control system. The control data management device includes a control data conversion section for converting a control data item requested by the first request section, into a format corresponding to the type notified by the program version notification section provided in the control system requesting, and for thereafter making the requested data output section output the control data item to the main exchanger.

Therefore, a change operation on a control data item for every version of the exchange program is carried out by the control data management device, and the control data item can then be sent to the main exchange system. As a result, it is possible to prevent the memory capacity in the control systems from being pressed, and conversion processing can be performed on real time, so that the time required for processing can be reduced.

(12) In a twelfth exchange system according to the present invention, each of the control systems described in the second to eleventh exchange systems includes a storage area monitor section for determining whether or not an empty area exists for storing a new control data item, and a control data erase section for obtaining an empty area by erasing a predetermined control data item among control data items stored in the control data storage section at a time point at which a determination is made by the storage area monitor section, if the storage area monitor section determines that no empty area for storing a new control data item exists in the control data storage section, when acquiring a new control data item. A control data item newly acquired is stored into the empty area obtained by the control data erase section.

Therefore, in a case where an empty area for storing a new control data item does not exists in the control data storage section, a new storage area can be obtained by erasing a predetermined control data item, so that the capacity of the storage device included in the main exchange system can be reduced, regardless of an increase of control data items in accordance with an increase of exchange services.

(13) In a thirteenth exchange system according to the present invention, the control data erase section described in the twelfth exchange system is arranged so as to erase one of a control data item acquired last, a control data item to which the exchange control section referred earliest, or a control data item to which the exchange control section referred at a lowermost frequency.

Therefore, when erasing a control data item stored in the control data storage section, control data items are erased orderly from a control data item acquired last, a control data item to which the exchange control section referred earliest, and a control data item to which the exchange control section referred at a lowermost frequency. Accordingly, a reduction of the capacity of the storage device, as described above, can be carried out more effectively.

(14) In a fourteenth exchange system according to the present invention, the control data erase section described in the thirteenth exchange system is arranged so as to erase one of a control data item acquired last, a control data item to which the exchange control section referred earliest, and a control data item to which the exchange control section referred at a lowermost frequency, among control data items other than the predetermined control data item.

Therefore, with a predetermined control data item remaining in the control data storage section, the other control data items can be erased, so that the storage area in the control data storage section can be stored without erasing minimum control data items necessary for providing exchange services.

(15) According to a fifteenth exchange system of the present invention, a control data change history information item is generated by associating a context of a control data item as a target to be processed, with an ID of the control data item, after an operation such as registration of a control data item, a change thereof, deletion thereof, or the like is carried out, and the control data item is stored into a memory or an external storage device. A history not only concerning a change according to a command inputted by a maintenance man or the like but also concerning a change of a control data item set by a telephone terminal or the like can be stored. Even if the system comprises a plurality of control systems, it is possible to perform an operation such as registration, a change, deletion, or the like, on a control data item common to all the control systems or a control data item common to part of the control systems.

(16) According to a sixteenth exchange system of the present invention, there are provided a section for performing change processing on a control data item stored in the storage section, based on the control data change history item, at a predetermined time or upon a request from a maintenance man or the like, and a section for erasing the control data change history information item in the memory or the external storage device.

Therefore, it is possible to avoid a situation that a control data item, which is registered, changed, or deleted until storing is completed after once having started storing a control data item in the memory, into the external storage device, at a predetermined time or a time requested by a maintenance man or a system manager, is not stored in the external storage device. Besides, maintenance management of a new control data item can be securely performed by effectively using a limited area for storing commands, in the memory and the external storage device in the control systems.

(17) According to a seventeenth exchange system of the present invention, a control data item in the memory is compared with a control data item in the external storage device, and the control data item in the memory is changed by referring to a control data change history stored in the operating memory and the external storage device if both of the contexts are not equal to each other, and by referring to the control data item in the external storage device if a corresponding control data change history information item is not stored in the control data change history. Therefore, control data items broken due to hardware malfunctions, software bugs, or the like can be recovered, so that the reliability of the control systems can be improved.

(18) According to an eighteenth exchange system of the present invention, a control data file is generated by a control data ID for identifying a control data item, and a control data item corresponding to the control data ID, for every control data item inputted from an external input device, the control data file is transferred to the system main section and is stored into the external storage device, and the control data file is read from the external storage device to change a control data item which has been used, when the system main section starts operating.

Therefore, in case of registering, changing, or deleting a large amount of control data items when starting a new control system, when updating the version of software, when reconstructing control data items because of malfunctions, or when increasing, reducing, or moving telephone terminals contained in a control system, it is possible to shorten the processing time required for changing the control data items, so that the time period for which an exchange service relating to a change of a control data item is stopped is shortened, contributing to an improvement of the reliability of the system.

(19) According to a nineteenth exchange system of the present invention, in the control data management device, a control data file is generated by adding information concerning at least a type of data, a length of data, and an order of bytes forming data, to each of the control data ID in the control data file inputted and the control data context corresponding to the control data ID, and by recording a control data file in the order of bytes forming data, and the control data file is transferred to the system main section. On the other side, in the system main section, the control data ID and the data context corresponding to the control data ID are read in accordance with the type of data, the length of data, and the order of bytes forming data, recorded in the control data file, and the data is used to change a control data item which has been used. Therefore, it is possible to realize a function of compatibility processing by which a control data item inputted into the management device is processed into a control data file of a format which can be dealt with by the system main section, so that it is less necessary to generate control data files in compliance with every of the type of the system main section, the model thereof, the type of the CPU used therein, and the version of the exchange program also used therein.

(20) According to a twentieth exchange system of the present invention, there is provided a section for obtaining function property information representing a function of the main system (e.g., the type of the system main section, the model thereof, the type of the CPU, and the version of the exchange program) from the system main section, or a section for inputting the function property information from the external input device, and a control data file generated by the management device is converted into a format which can be dealt with by the system main section and is then transferred, on the basis of the function property information.

Therefore, it is less necessary to generate control data files in compliance with every of the type of the system main section, the model thereof, the type of the CPU used therein, and the version of the exchange program also used therein.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An exchange system comprising:
   a main device including a plurality of interface sections each containing one of an extension terminal, an office line, and a private line, and a plurality of exchange control systems;
   a control data management device connected to said main device and including a data storage section for storing control data items,
   wherein each of said plurality of exchange control systems includes an exchange section for exchanging connections of said interface sections, and a first request section for requesting a control data item necessary for an exchange service to be provided to said control data management device,
   said control data management device includes a requested data output section for reading the control data item requested by said first request section from said data storage section and for outputting the control data item to said main device,
   each of said plurality of exchange control systems includes
      an exchange control section for controlling said exchange section and the plurality of interface sections, based on the control data item outputted from the requested data output section, where said each of said plurality of exchange control systems is defined as an active system, and
      a control data storage section for storing the control data item outputted by said requested data output section,
   each of said first request sections requests to said control data management device, a control data item which is not stored in said control data storage section among control data items necessary for an exchange service to be performed by a control system whose first request section is requesting, and
   each of said exchange control sections controls said exchange section and the plurality of interface sections, based on the control data item outputted from said requested data output section and the control data items stored in said control data storage section, when said exchange control system including said each of said exchange control sections is defined as an active system.

2. An exchange system according to claim 1, wherein each of said first request sections requests, to said control data management device, a predetermined control data item among the number of control data items, when said exchange control system including said each of said first request sections defined as an active system is started.

3. An exchange system according to claim 2, wherein each of said first request sections requests, to said control data management device, a predetermined control data item among the number of control data items, even when said exchange control system including said each of said first request sections defined as a stand-by system is started.

4. An exchange system according to claim 1, wherein each of the plurality of exchange control systems includes
   a data rewrite command receiving section for receiving a control data change request supplied though the plurality of interface sections, and for instructing said control data management device of a control data item to be changed and a content of a change, in accordance with the change request, and
   said control data management device includes a first control data changing section for changing a control data item stored in said control data storage section, in accordance with an instruction by the data change command receiving section.

5. An exchange system according to claim 1, wherein each of said plurality of exchange control systems includes a data rewrite command receiving section for receiving a control data change request supplied though the plurality of interface sections, and for instructing said control data management device of a control data item to be changed and a content of a change, in accordance with the change request,
   said control data management device includes a first control data rewrite section for changing a control data item stored in said control data storage section, in accordance with an instruction by said data rewrite command receiving section, and a first notification section for notifying said main device of a correct completion of the change of the control data item, and
   each of said plurality of exchange control systems includes a first control data rewrite section for rewriting a corresponding control data item in said control data storage section in accordance with a notification from said first notification section.

6. An exchange system according to claim 1, wherein said control data management device includes a second control data change section for receiving a predetermined control data change request and for changing a control data item stored in said control data storage section, in accordance with said control data change request.

7. An exchange system according to claim 1, wherein
said control data management device includes a second control data change section for receiving a predetermined control data change request and for changing a control data item stored in said control data storage section, in accordance with said control data change request, and a second notification section for notifying said main device of a correct completion of the change of the control data item by said second control data change section, and each of said plurality of exchange control systems includes a second control data change section for changing a corresponding control data item in said control data storage section in accordance with a notification from said second notification section.

8. An exchange system according to claim 1, wherein each of said plurality of exchange control systems includes:
an acquirement status determining section for determining whether or not a control data requested by said first request section is acquired correctly, where any of said exchange control systems is defined as an active system;
a second request section for requesting a control system defined as a stand-by system to send a corresponding control data item if said acquirement status determining section determines that a control data item has not been correctly outputted to said main device, where a control system is defined as an active system; and
a requested data transfer section for transferring a corresponding control data item to a control system requesting, if a control data item corresponding to a request from said second request section is stored in said control data storage section, and
if a control data item is transferred by said requested data transfer section, said exchange control section continues to control said exchange section and the plurality of interface sections in accordance with the control data item, and if no control data item is transferred by said requested data transfer section, said exchange control section stops controlling said exchange section and the plurality of interface sections.

9. An exchange system according to claim 1, wherein each of said plurality of exchange control systems includes:
an external storage section for storing a control data item outputted from said requested data output section, at a predetermined timing;
an acquirement status determining section for determining whether or not a control data requested by said first request section has been acquired correctly, where any of said exchange control systems is defined as an active system; and
a control data retrieve section for retrieving a corresponding control data item from control data items stored in said external storage device and for reading the corresponding control data item, if said acquirement status determining section determines that a control data item has not been correctly outputted to said main device, and
if the corresponding control data item is read by said control data retrieve section, said exchange control section continues to control said exchange section and the plurality of interface sections in accordance with the control data item, and if no control data item is read by said control data retrieve section, said exchange control section stops controlling said exchange section and the plurality of interface sections.

10. An exchange system according to claim 1, wherein
said exchange control section of each of the plurality of exchange control systems includes an exchange program for controlling said exchange section and the plurality of interface sections, such that the exchange program can be updated,
each of said plurality of exchange control systems includes a program version notification section for notifying said control data management section, of the type of the exchange program of said control system, and
said control data management device includes a control data conversion section for converting a control data item requested by said first request section, into a format corresponding to the type notified by said program version notification section provided in the control system requesting, and for thereafter making said requested data output section output the control data item to said main device.

11. An exchange system according to claim 1, wherein each of said exchange control systems includes:
a storage area monitor section for determining whether or not an empty area exists for storing a new control data item; and
a control data erase section for obtaining an empty area by erasing a predetermined control data item among control data items stored in said control data storage section at a time point at which a determination is made by said storage area monitor section, if said storage area monitor section determines that no empty area for storing a new control data item exists in said control data storage section, when acquiring a new control data item, and
a control data item newly acquired is stored into the empty area obtained by said control data erase section.

12. An exchange system according to claim 11, wherein said control data erase section erases one of a control data item acquired last, a control data item to which said exchange control section referred earliest, and a control data item to which said exchange control section referred at a lowermost frequency.

13. An exchange system according to claim 12, wherein said control data erase section erases one of a control data item acquired last, a control data item to which said exchange control section referred earliest, or a control data item to which said exchange control section referred at a lowermost frequency, among control data items other than the predetermined control data item.

14. An exchange system containing at least one control system and managed with use of a memory or an external storage device, by associating a control data item necessary for said control system to provide an exchange service, with an ID of the control data item, the system comprising:
an analysis section for analyzing a control data change request relating to registration, change, and deletion of the control data item, from an external input device or a telephone terminal;
a change processing section for performing change processing corresponding to the control data change request, based on an analysis result of the analysis section; and a control data change history control section for generating a control data change history information item, by associating a context of a control data item as a target to be processed, after a change, with an ID of the control data item, when the change processing is performed, and for storing the control data item into said memory and/or said external storage device, wherein when said system starts or the control data change request is issued, the control data change history information item stored in said memory or said external storage device is analyzed, and change processing of the control data change history information item in said memory is performed again in accordance with the control data change history information item.

15. An exchange system according to claim 14, further comprising a change processing start control section for performing change processing on a control data item stored in said storage section, based on the control data change history item, when a control data change history information storage area exceeds a preset storage capacity in said memory or said external storage device, or for every control data change request from said external input device and said telephone terminal.

16. An exchange system according to claim 14, further comprising an erase section for erasing the control data change history information item in said memory or said external storage device, when data in said memory is stored into said external storage device, or when change processing is performed on a control data item stored in said external storage device, based on the control data change history information item.

17. An exchange system according to claim 14, further comprising:

a comparison section for comparing a context of a control data item in said memory with a context of a control data item in said external storage device; and means for changing the control data item in said memory by referring to a control data change history stored in said operating memory and said external storage device if both of the contexts are not equal to each other, and by referring to the control data item in said external storage device if a corresponding control data change history information item is not stored in the control data change history.

18. An exchange system containing at least one control system and comprising a system main section having a memory for storing a control data item necessary for said control system to provide an exchange service, and a management device connected to said system main section through a communication path and having a function of registering, changing, and deleting the control data item, for performing operation management of said system main section, wherein said management device comprises:

a control data file generating section for generating a control data file including a control data ID for identifying a control data item, and a control data item corresponding to the control data ID, for every control data item inputted from an external input device;

a storage section for storing the control data file; and a transfer control section for transferring the control data file stored in said storage section, to said system main section through said communication path; and said system main section comprises:

a reception control section for controlling reception of the control data file transferred from said management device;

a temporary storage section for temporarily storing the control data file received by said reception control section; and a control data update processing section for storing the control data file stored in said temporary storage section, into said operating memory, thereby to update a corresponding control data item, when said system of itself starts operating.

19. An exchange system according to claim 18, wherein said control data file generating section includes a control data compatibility processing section for processing a control data item inputted, so as to be a control data file of a format which can be dealt with by said system main section.

20. An exchange system according to claim 19, wherein said control data compatibility processing section includes a first recording section for adding information concerning at least a type of data, a length of data, and an order of bytes forming data, to each of the control data ID in the control data file inputted and the control data context corresponding to the control data ID, and for recording the control data file into the storage section, in the order of bytes forming data, and said control data update processing section includes a first read section for reading the control data file stored in said temporary storage section, into said operating memory, in a manner in which the control data ID and the data context corresponding to the control data ID are read in accordance with the type of data, the length of data, and the order of bytes forming data, recorded in the control data file.

21. An exchange system according to claim 19, wherein said control data compatibility processing section is constituted by a second recording section for adding information concerning at least a type of data, a length of data, and an order of bytes forming data, to each of the control data ID in the control data file inputted and the control data context corresponding to the control data ID, and for recording the control data file into said storage section, in the order of bytes forming data, and said control data update processing section includes a second read section for reading the control data file stored in said temporary storage section, into said operating memory, in a manner in which the control data ID and the data context corresponding to the control data ID are read in accordance with the type of data, the length of data, and the order of bytes forming data, recorded in the control data file.

22. An exchange system according to claim 18, wherein said management device comprises:

a determining section for determining whether the control data file inputted is of a format which can be read by said system main section; and a conversion section for converting the control data file into a format which can be read by said system main section can read if the control data file is determined as not being of a format which can be read by said system main section.

23. An exchange system according to claim 22, wherein said management device includes a function property acquirement section for obtaining function property information representing a function of said main system body, and said determining section makes a determination, based on the function property information obtained from said system main section.

24. An exchange system according to claim 23, wherein the function property information contains at least a type of said system main section, a model thereof, a CPU type thereof, and a version of an exchange program thereof.

25. An exchange system according to claim 22, wherein said management device includes a function property setting section for setting the function property information inputted from said external input device, and said determining section makes a determination, based on the function property information obtained from said system main section.

26. An exchange system according to claim 25, wherein the function property information contains at least a type of said system main section, a model thereof, a CPU type thereof, and a version of an exchange program thereof.

27. An exchange system comprising:

a main device including a plurality of interface sections each containing one of an extension terminal, an office line, and a private line, and a plurality of exchange control systems; and a control data management device connected to said main device and including a data storage section for storing control data items, wherein each of said plurality of exchange control systems includes an exchange section for exchanging connections of said interface sections, and a first request section for requesting a control data item necessary for an exchange service to be provided to said control data management device, said control data management device includes a requested data output section for reading the control data item requested by said first request section from said data storage section and for outputting the control data item to said main device, each of said plurality of exchange control systems includes an exchange control section for controlling said exchange section and the plurality of interface sections, based on the control data item outputted from the requested data output section, where said each of said plurality of exchange control systems is defined as an active system and said exchange control section of each of the plurality of exchange control systems includes an exchange program for controlling said exchange section and the plurality of interface sections, such that the exchange program can be updated, and a program version notification section for notifying said control data management section, of the type of the exchange program of said control system, and said control data management device includes a control data conversion section for converting a control data item requested by said first request section, into a format corresponding to the type notifed by said program version notification section provided in the control system requesting, and for thereafter making said requested data output section output the control data item to said main device.

\* \* \* \* \*

UNITED STATES PATENT AND TRADEMARK OFFICE
CERTIFICATE OF CORRECTION

PATENT NO.  : 6,167,053
DATED       : December 26, 2000
INVENTOR(S) : Shuichi SATO It is certified that error appears in the above-identified patent and that said Letters Patent is hereby corrected as shown below:

In Claim 1, col. 43, line 47, after "systems;", insert --and--.
In Claim 1, col. 44, line 7, after "requests", insert a comma.
In Claim 14, col. 47, line 7, "and/or" should read --or--.
In Claim 27, col. 50, line 24, "notifed" should read --notified--.

Signed and Sealed this

Eighth Day of May, 2001

Attest:

NICHOLAS P. GODICI

Attesting Officer

*Acting Director of the United States Patent and Trademark Office*